(12) United States Patent
Melton et al.

(10) Patent No.: US 7,090,407 B2
(45) Date of Patent: Aug. 15, 2006

(54) PRECONNECTORIZED FIBER OPTIC DROP CABLES AND ASSEMBLIES FOR EFFICIENT DEPLOYMENT

(75) Inventors: Stuart R. Melton, Hickory, NC (US); Hieu V. Tran, Charlotte, NC (US); David A. Thompson, Newton, NC (US); Richard S. Wagman, Hickory, NC (US); Michael J. Gimblet, Hickory, NC (US); Xin Liu, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 189 days.

(21) Appl. No.: 10/765,434

(22) Filed: Jan. 27, 2004

(65) Prior Publication Data
US 2004/0228589 A1 Nov. 18, 2004

Related U.S. Application Data

(60) Continuation-in-part of application No. 10/659,666, filed on Sep. 10, 2003, now Pat. No. 6,899,467, which is a division of application No. 09/967,259, filed on Sep. 28, 2001, now Pat. No. 6,648,520, said application No. 10/765,434 and a continuation-in-part of application No. 10/294,136, filed on Nov. 14, 2002, now Pat. No. 6,714,710, is a continuation of application No. 09/645,916, filed on Aug. 25, 2000, now Pat. No. 6,542,674, said application No. 10/765,434 and a continuation-in-part of application No. 10/383,468, filed on Mar. 7, 2003, now Pat. No. 6,785,450, is a continuation of application No. 09/579,555, filed on May 26, 2000, now Pat. No. 6,546,175.

(51) Int. Cl.
*G02B 6/00* (2006.01)

(52) U.S. Cl. .......................... 385/62; 385/147; 385/78

(58) Field of Classification Search ............ 385/78–80, 385/62, 147
See application file for complete search history.

(56) References Cited

U.S. PATENT DOCUMENTS

| | | | |
|---|---|---|---|
| 4,902,238 A | 2/1990 | Iacobucci | 439/135 |
| 4,961,623 A | 10/1990 | Midkiff et al. | 350/96.2 |

(Continued)

FOREIGN PATENT DOCUMENTS

| | | |
|---|---|---|
| DE | 3537684 | 4/1987 |
| EP | 0856761 A1 | 8/1988 |

(Continued)

OTHER PUBLICATIONS

Corning Cable Systems, "SST Figure-8 Drop Cables 1-12 Fibers".
Corning Cable Systems, "SST-Drop (Dielectric) Cables 1-12 Fibers".

(Continued)

*Primary Examiner*—Frank G. Font
*Assistant Examiner*—Eric Wong
(74) *Attorney, Agent, or Firm*—Michael E. Carroll, Jr.

(57) ABSTRACT

A preconnectorized outdoor cable streamlines the deployment of optical waveguides into the last mile of a optical network. The preconnectorized outdoor cable includes a cable and at least one plug connector. The plug connector is attached to a first end of the cable, thereby connectorizing at least one optical waveguide. The cable has at least one optical waveguide, at least one tensile element, and a cable jacket. Various cable designs such as figure-eight or flat cables may be used with the plug connector. In preferred embodiments, the plug connector includes a crimp assembly having a crimp housing and a crimp band. The crimp housing has two half-shells being held together by the crimp band for securing the at least one tensile element. When fully assembled, the crimp housing fits into a shroud of the preconnectorized cable. The shroud aides in mating the preconnectorized cable with a complimentary receptacle.

48 Claims, 23 Drawing Sheets

U.S. PATENT DOCUMENTS

| | | | |
|---|---|---|---|
| RE37,028 E | 1/2001 | Cooke et al. | 385/112 |
| 6,188,822 B1 | 2/2001 | McAlpine et al. | 385/100 |
| 6,206,579 B1 | 3/2001 | Selfridge et al. | 385/60 |
| 6,234,683 B1 * | 5/2001 | Waldron et al. | 385/78 |
| 6,264,374 B1 | 7/2001 | Selfridge et al. | 385/78 |
| 6,305,849 B1 | 10/2001 | Roehrs et al. | 385/59 |
| 6,357,929 B1 | 3/2002 | Roehrs et al. | 385/59 |
| 6,371,660 B1 | 4/2002 | Roehrs et al. | 385/59 |
| 6,427,035 B1 | 7/2002 | Mahony | 385/15 |
| 6,466,725 B1 | 10/2002 | Battey et al. | 385/135 |
| 6,496,641 B1 | 12/2002 | Mahony | 385/135 |
| 6,522,804 B1 | 2/2003 | Mahony | 385/24 |
| 6,539,147 B1 | 3/2003 | Mahony | 385/24 |
| 6,542,674 B1 * | 4/2003 | Gimblet | 385/113 |
| 6,546,175 B1 | 4/2003 | Wagman et al. | 385/113 |
| 6,579,014 B1 | 6/2003 | Melton et al. | 385/76 |
| 6,614,980 B1 | 9/2003 | Mahony | 385/135 |
| 6,619,697 B1 | 9/2003 | Griffioen et al. | 285/126.1 |
| 6,625,375 B1 | 9/2003 | Mahony | 385/135 |
| 6,648,520 B1 | 11/2003 | McDonald et al. | 385/78 |
| 6,668,127 B1 | 12/2003 | Mahony | 385/135 |
| 6,678,448 B1 | 1/2004 | Moisel et al. | 385/101 |
| 2001/0036345 A1 | 11/2001 | Gimblet et al. | |
| 2002/0062978 A1 | 5/2002 | Sakabe et al. | |
| 2003/0063867 A1 | 4/2003 | McDonald et al. | |
| 2003/0094298 A1 | 5/2003 | Morrow et al. | |
| 2004/0120663 A1 | 6/2004 | Lail et al. | |

FOREIGN PATENT DOCUMENTS

| | | |
|---|---|---|
| EP | 0547778 A1 | 6/1993 |
| EP | 0762171 A1 | 3/1997 |
| EP | 1258758 A2 | 11/2002 |
| JP | 62-054204 | 3/1987 |
| JP | 05106765 | 4/1993 |
| JP | 2001116968 | 4/2001 |

OTHER PUBLICATIONS

Corning Cable Systems "SST-Drop (Armor) Cables 1-12 Fibers".
INFOLITE Data Sheet.
STRATOS Lightwave™, Hybrid HMA Series, Jul. 16, 2002.
Fiber Systems International Fiber Optic Solutions Product Sheet, TFOCA-II® 4-Channel Fiber Optic Connector, 2 sheets, 2003.

* cited by examiner

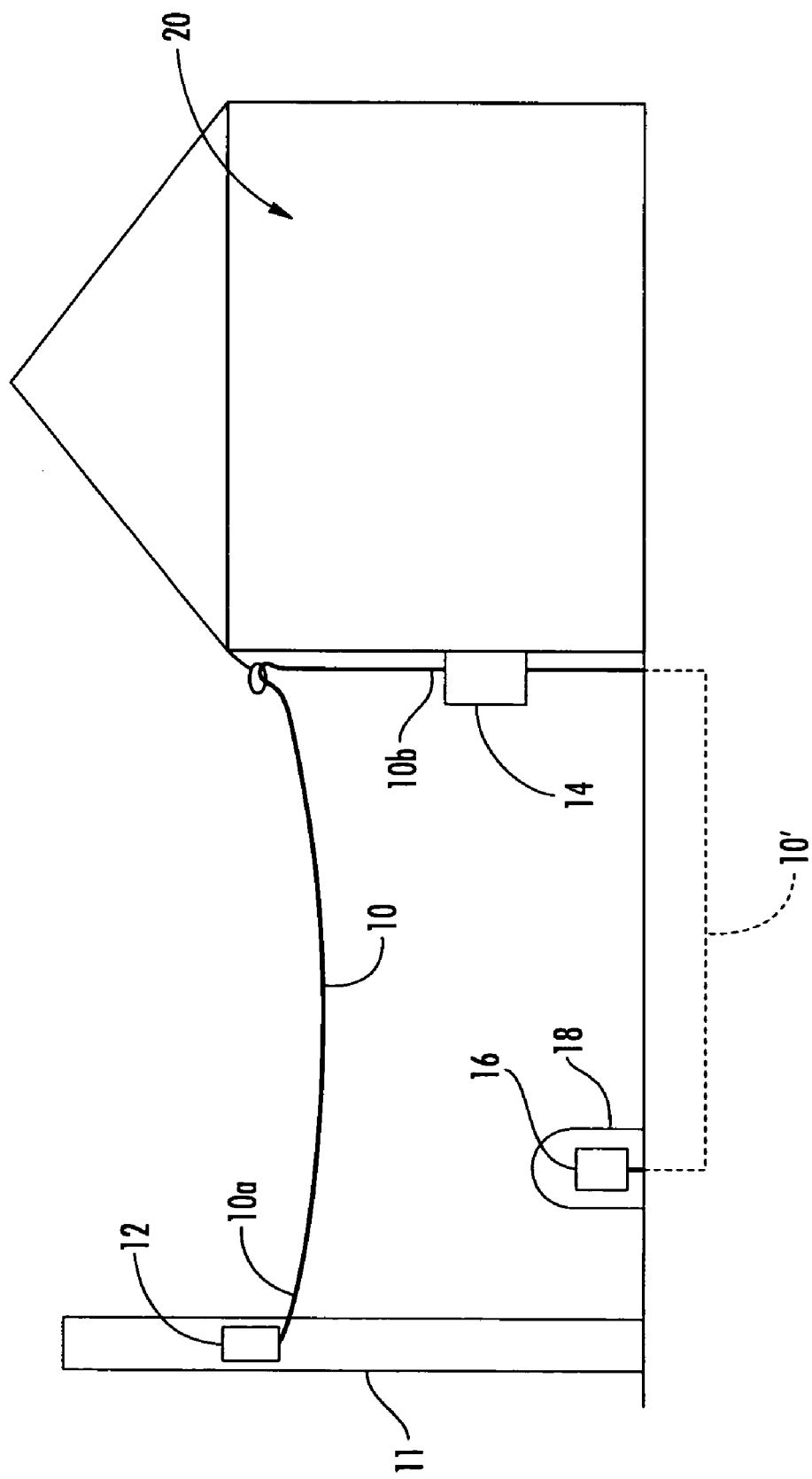

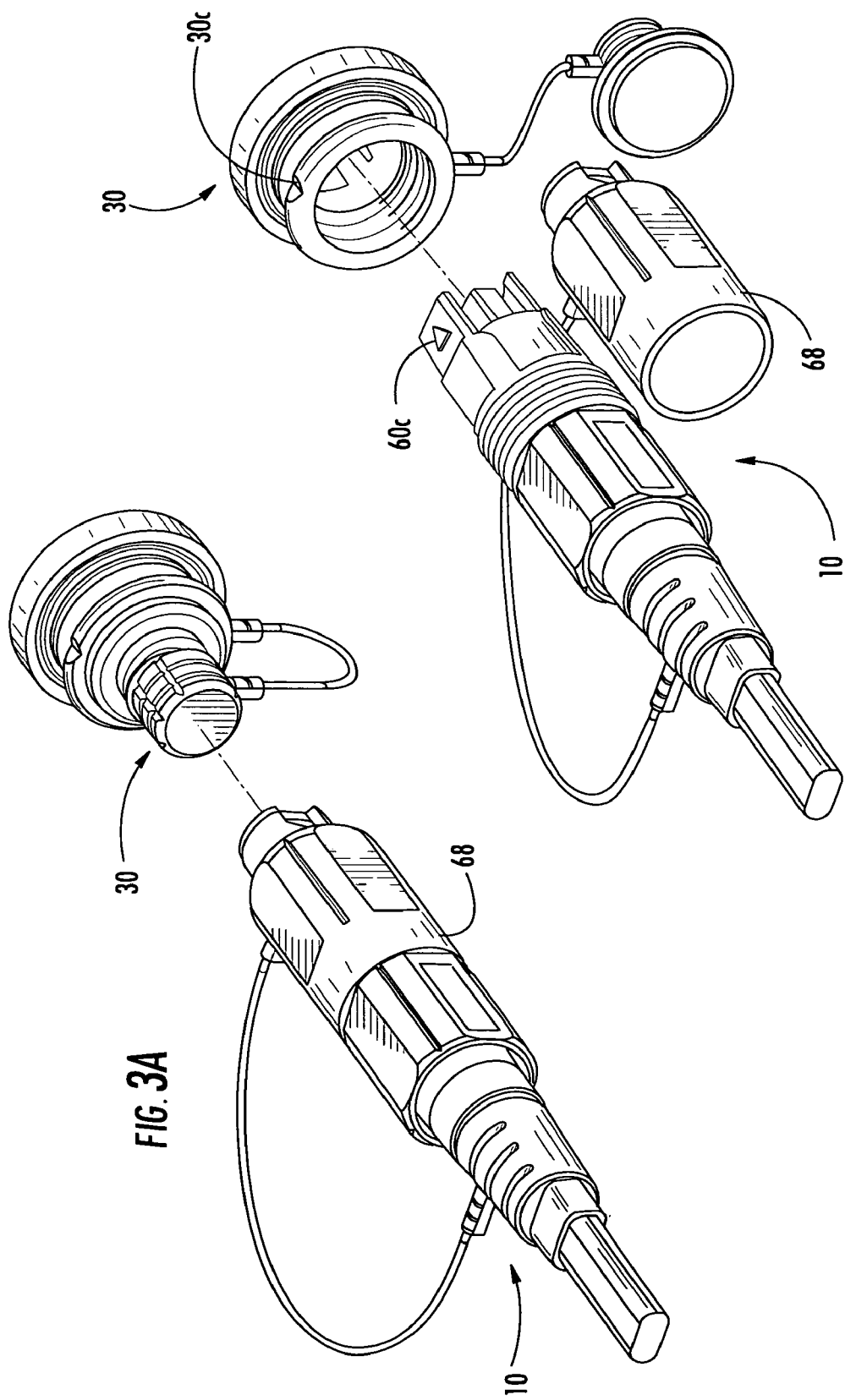

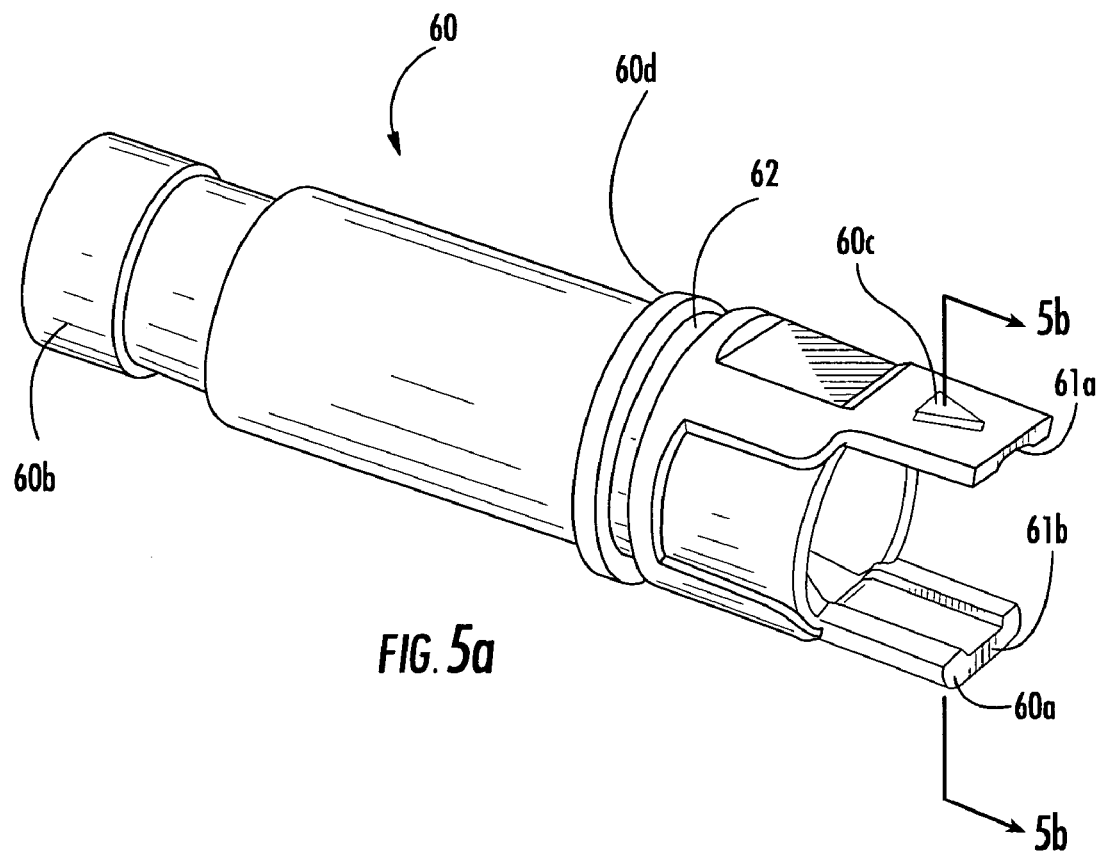
FIG. 5a
FIG. 5b

PRECONNECTORIZED FIBER OPTIC DROP CABLES AND ASSEMBLIES FOR EFFICIENT DEPLOYMENT

RELATED APPLICATIONS

The present application is a Continuation-in-Part of U.S. Ser. No. 10/659,666 filed on Sep. 10, 2003 now U.S. Pat. No. 6,899,467, which is a Divisional of U.S. Ser. No. 09/967,259 filed on Sep. 28, 2001 now U.S. Pat. No. 6,648,520. The present application is also a Continuation-in-Part of U.S. Ser. No. 10/294,136 filed on Nov. 14, 2002 now U.S. Pat. No. 6,714,710, which is a Continuation of U.S. Ser. No. 09/645,916 filed on Aug. 25, 2000 now U.S. Pat. No. 6,542,674. The present application is also a Continuation-in-Part of U.S. Ser. No. 10/383,468 filed on Mar. 7, 2003 now U.S. Pat. No. 6,785,450, which is a Continuation of U.S. Ser. No. 09/579,555 filed on May 26, 2000 now U.S. Pat. No. 6,546,175. The present application is also related to U.S. patent application Ser. No. 10/765,262 titled "Figure-Eight Preconnectorized Fiber Optic Drop Cables and Assemblies" and Ser. No. 10/765,434 titled "Preconnectorized Fiber Optic Drop Cables and Assemblies" filed on even date herewith, the disclosures of which are incorporated herein by reference.

FIELD OF THE INVENTION

The present invention relates generally to optical networks. More specifically, the invention relates to preconnectorized fiber optic drop cables and assemblies useful for optical networks that bring fiber to the 'x' location (FTTX) and the like.

BACKGROUND OF THE INVENTION

Communication networks are used to transport a variety of signals such as voice, video, data transmission, and the like. Traditional communication networks use copper wires in cables for transporting information and data. However, copper cables have drawbacks because they are large, heavy, and can only transmit a relatively limited amount of data. On the other hand, an optical waveguide is capable of transmitting an extremely large amount of bandwidth compared with a copper conductor. Moreover, an optical waveguide cable is much lighter and smaller compared with a copper cable having the same bandwidth capacity. Consequently, optical waveguide cables replaced most of the copper cables in long-haul communication network links, thereby providing greater bandwidth capacity for long-haul links. However, many of these long-haul links have bandwidth capacity that is not being used. This is due in part to communication networks that use copper cables for distribution and/or drop links on the subscriber side of the central office. In other words, subscribers have a limited amount of available bandwidth due to the constraints of copper cables in the communication network. Stated another way, the copper cables are a bottleneck that inhibit the subscriber from utilizing the relatively high-bandwidth capacity of the long-hauls links.

As optical waveguides are deployed deeper into communication networks, subscribers will have access to increased bandwidth. But there are certain obstacles that make it challenging and/or expensive to route optical waveguides/ optical cables deeper into the communication network, i.e., closer to the subscriber. For instance, making a suitable optical connection between optical waveguides is much more difficult than making an electrical connection between copper wires. This is because optical connections require special tools and equipment, highly trained craftsman, along with precision components. Additionally, as the communication network pushes toward subscribers, the communication network requires more connections, which compounds the difficulties of providing optical waveguides to the premises of the subscriber. Hence, the routing of optical waveguides to the proverbial last mile of the network has yet to enjoy commercial success.

One common way to connect optical waveguides is by using optical connectors. Optical connectors generally hold the mating optical waveguides in respective ferrules of the mating connectors. The ferrules and optical waveguides therein require polishing of the end face for proper operation. Polishing a ferrule is a relatively complex process that generally requires several steps along with inspection and testing using precision equipment to verify an acceptable insertion loss. In other words, installing connectors is best performed in a factory setting under ideal working conditions.

Another common way to make an optical connection is by fusion splicing. Fusion splicing requires that the ends of the optical fibers be precisely aligned so that the transfer the optical signal between the ends of the optical waveguides has a relatively low-loss. But like connectors, fusion splicing requires highly trained craftsman and special equipment to make and test the optical connection, thereby making it a relatively expensive and inefficient proposition for field connectorization. Thus, there is need for an efficient and relatively low-cost method of reliably making optical connections in the field without using specialized equipment and highly skilled labor.

BRIEF DESCRIPTION OF THE FIGS.

FIG. 1 schematically depicts a portion of an optical communication network for providing fiber to the subscriber at location 'x' (FTTx).

FIG. 2 schematically illustrates the drop link portion of the optical network of FIG. 1 having a preconnectorized fiber optic drop cable according to the present invention.

FIG. 3a–c shows a portion of the preconnectorized fiber drop cable being plugged into a receptacle according to the present invention.

Figure 4:
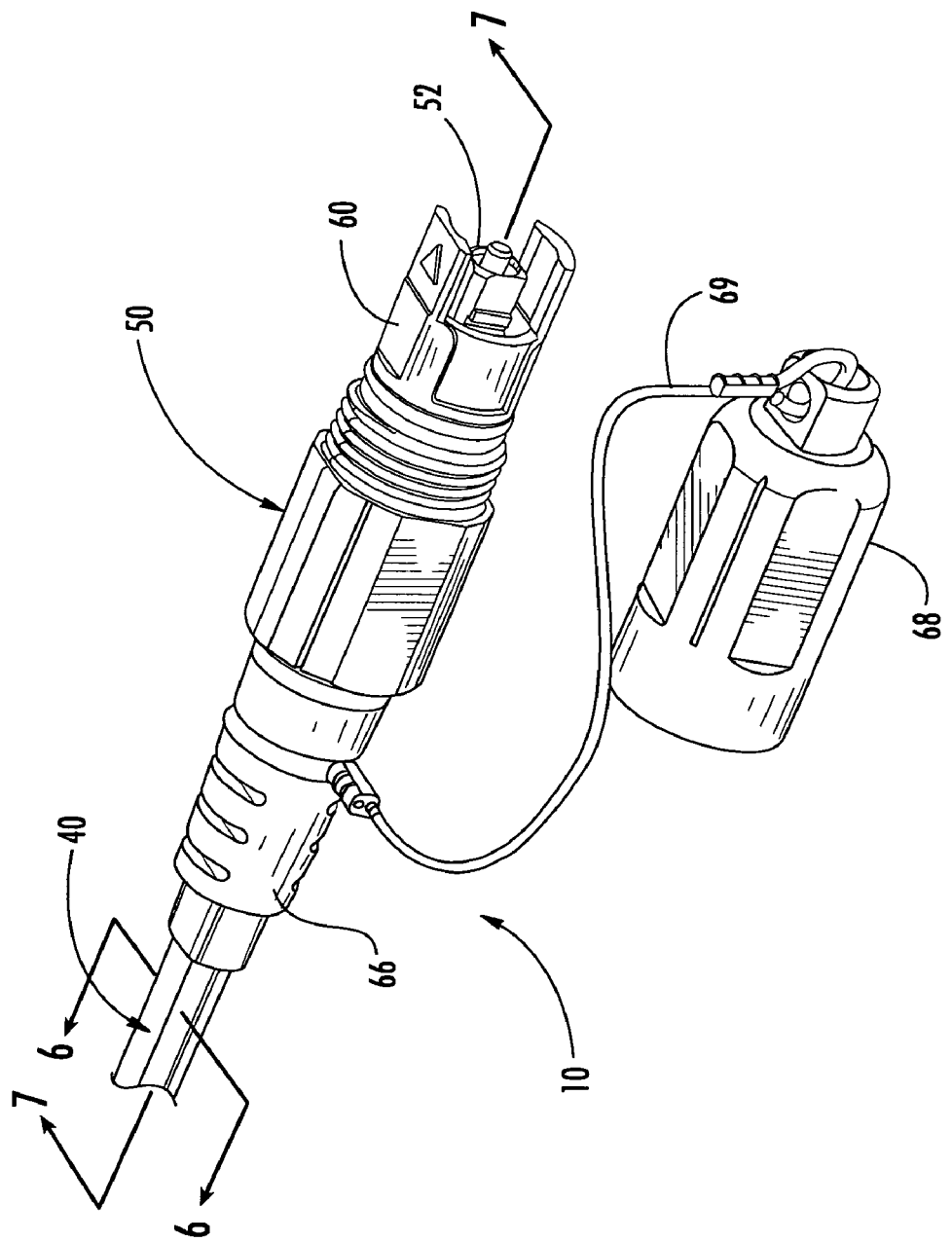
FIG. 4 is an assembled perspective view of the preconnectorized fiber optic drop cable according to the present invention.

FIGS. 5a and 5b respectively are a perspective view and a sectional view of the shroud of FIG. 4.

Figure 6:
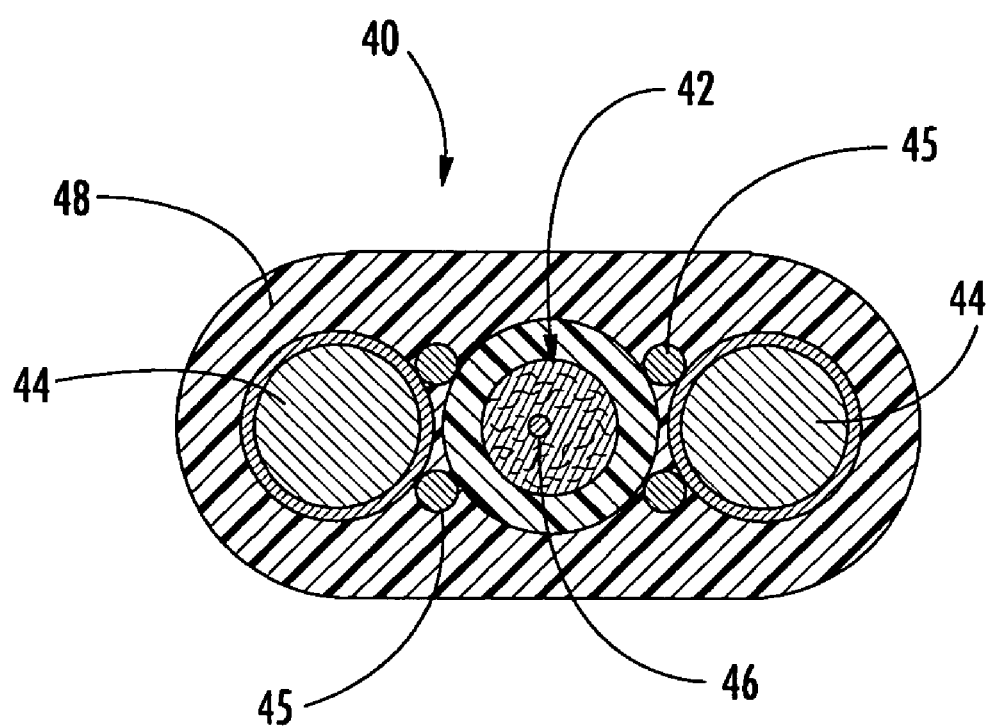

FIG. 6 is a cross-sectional view of the cable taken along line 6—6 as shown in FIG. 4.

Figure 5:
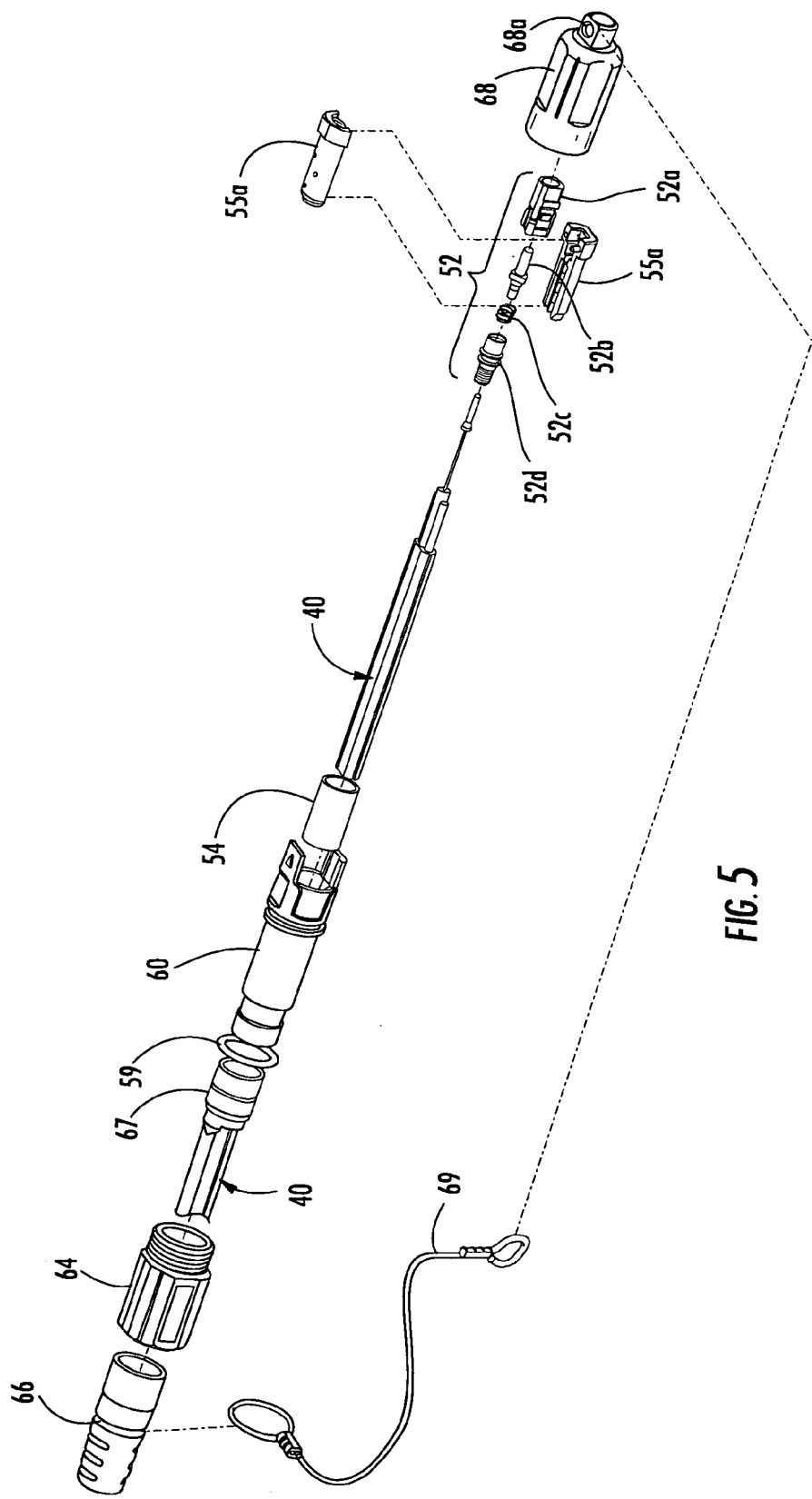
FIG. 5 is an exploded view of the preconnectorized fiber optic drop cable of FIG. 4.
Figure 6A:
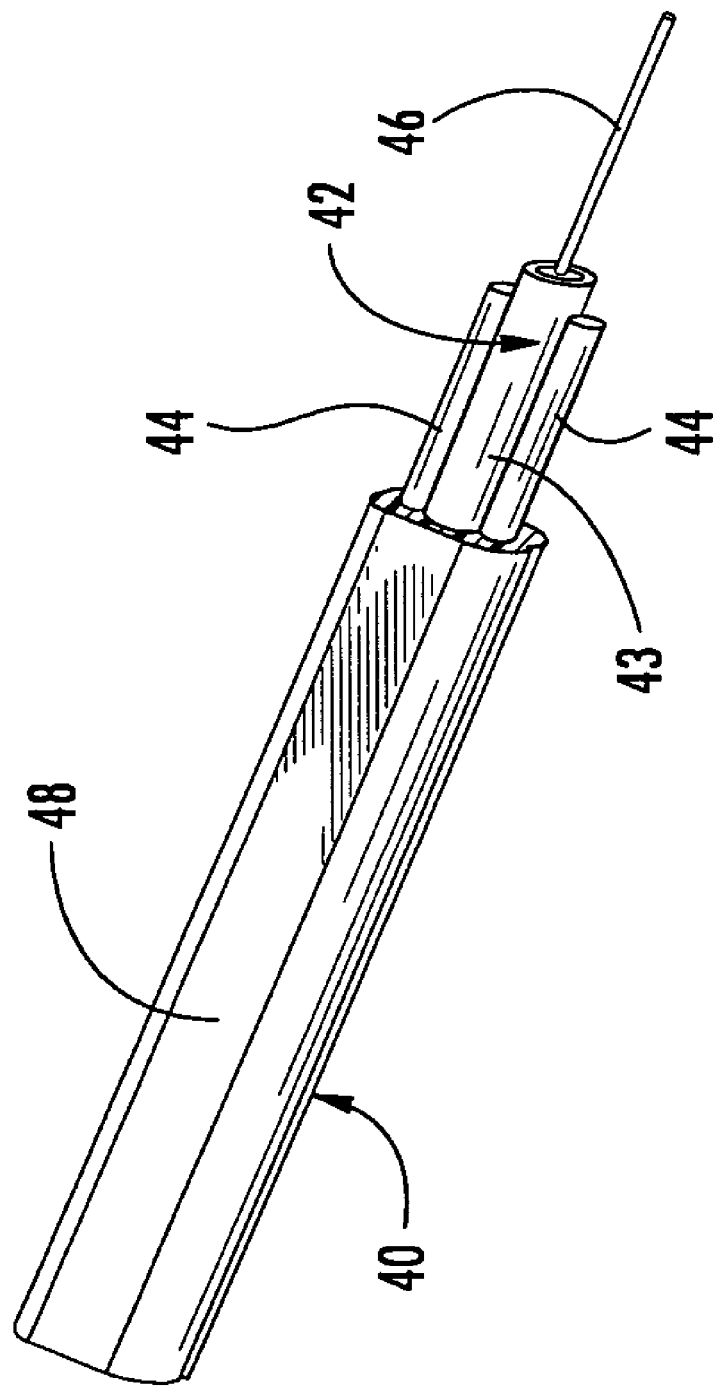

FIG. 6a is a perspective view of the cable of FIG. 5 prepared for connectorization.

Figure 6B:
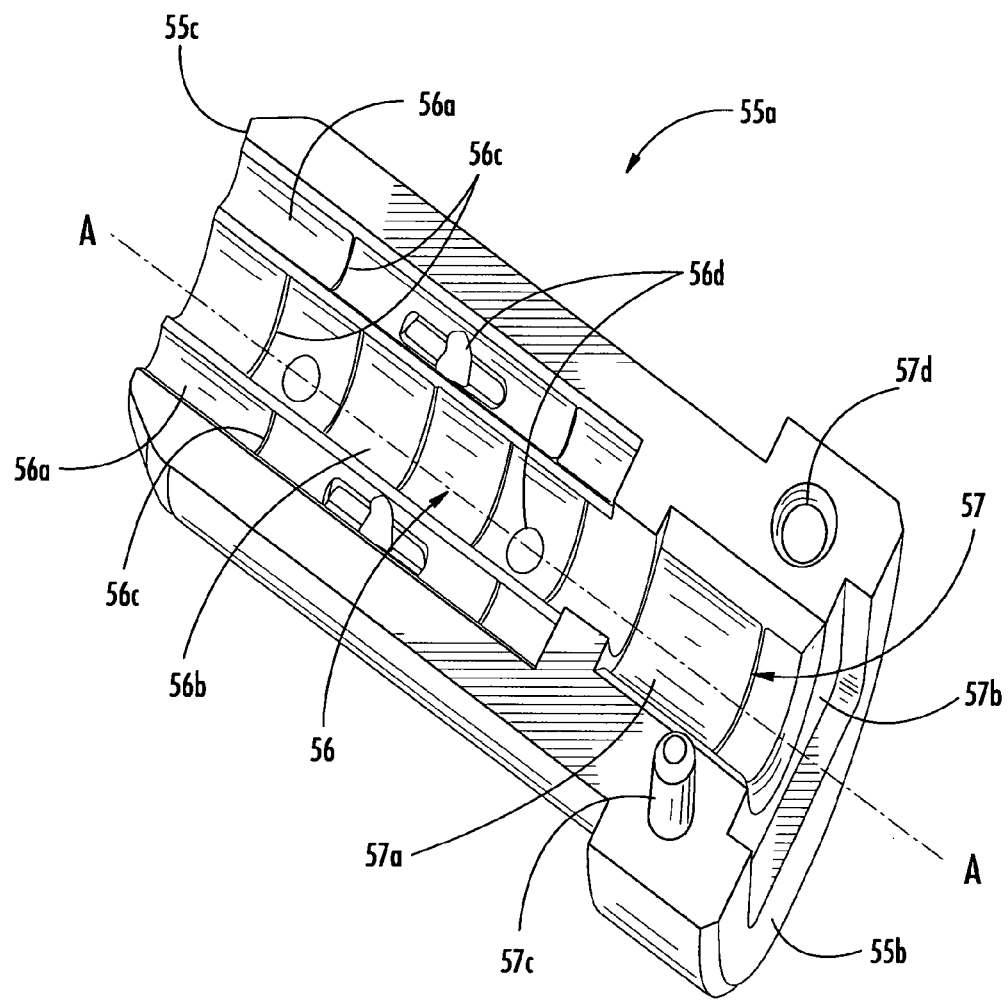

FIG. 6b is a perspective view of one half-shell of the crimp housing of FIG. 5.

Figure 6C:
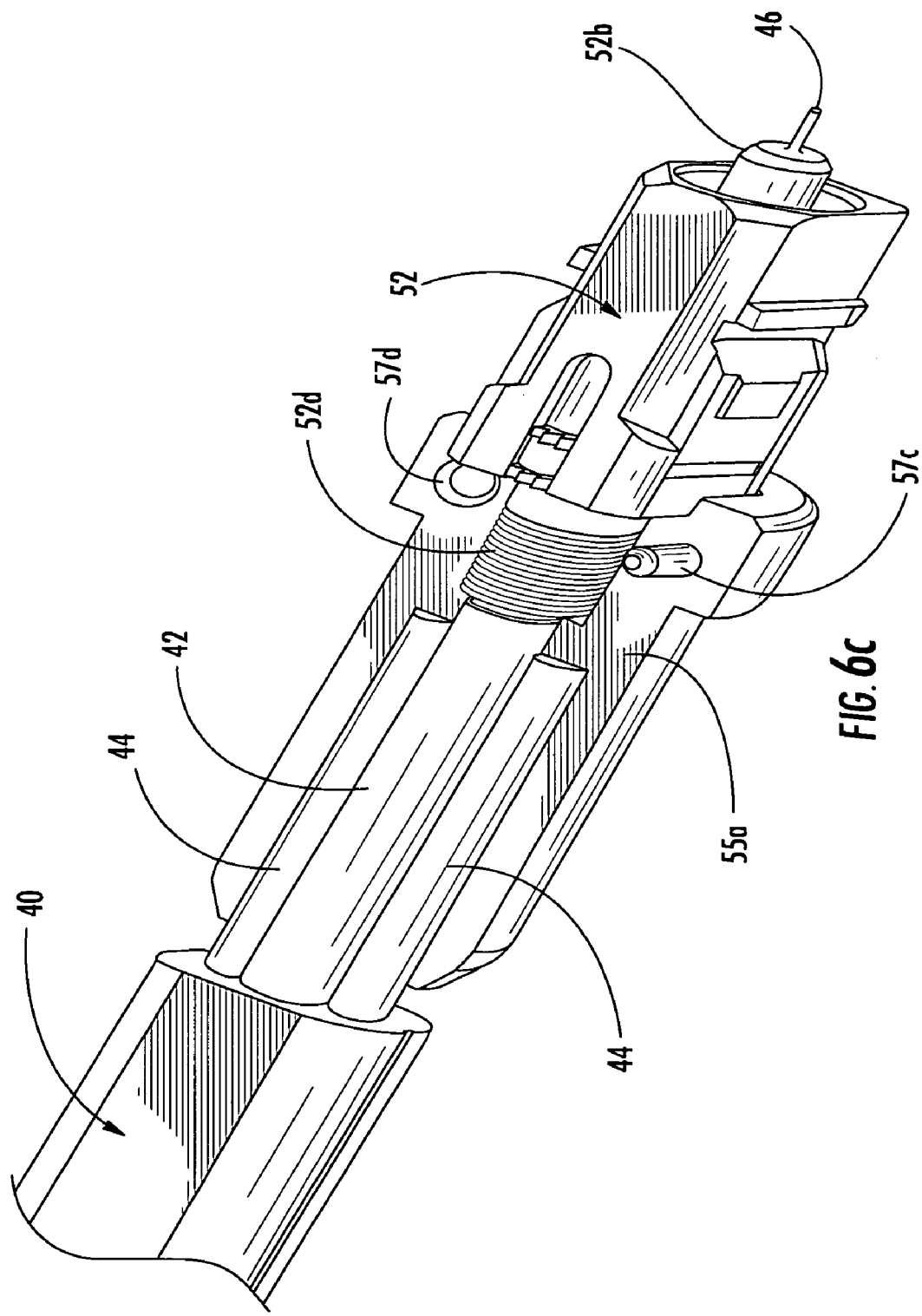

FIG. 6c shows a portion of the connector assembly of FIG. 4 attached to the cable and positioned within the half-shell of FIG. 6b.

Figure 6D:
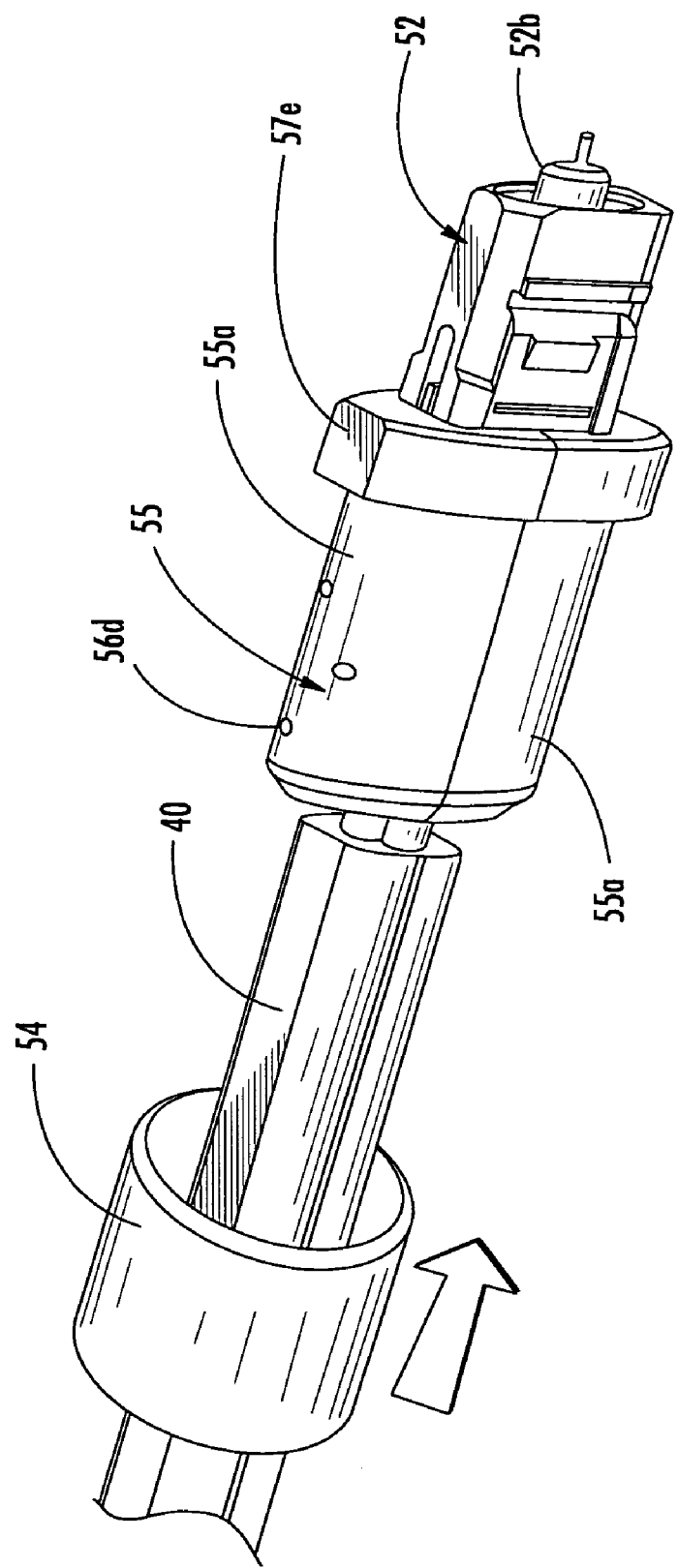

FIG. 6d shows the partially assembly crimp assembly being attached to the cable.

Figure 7:
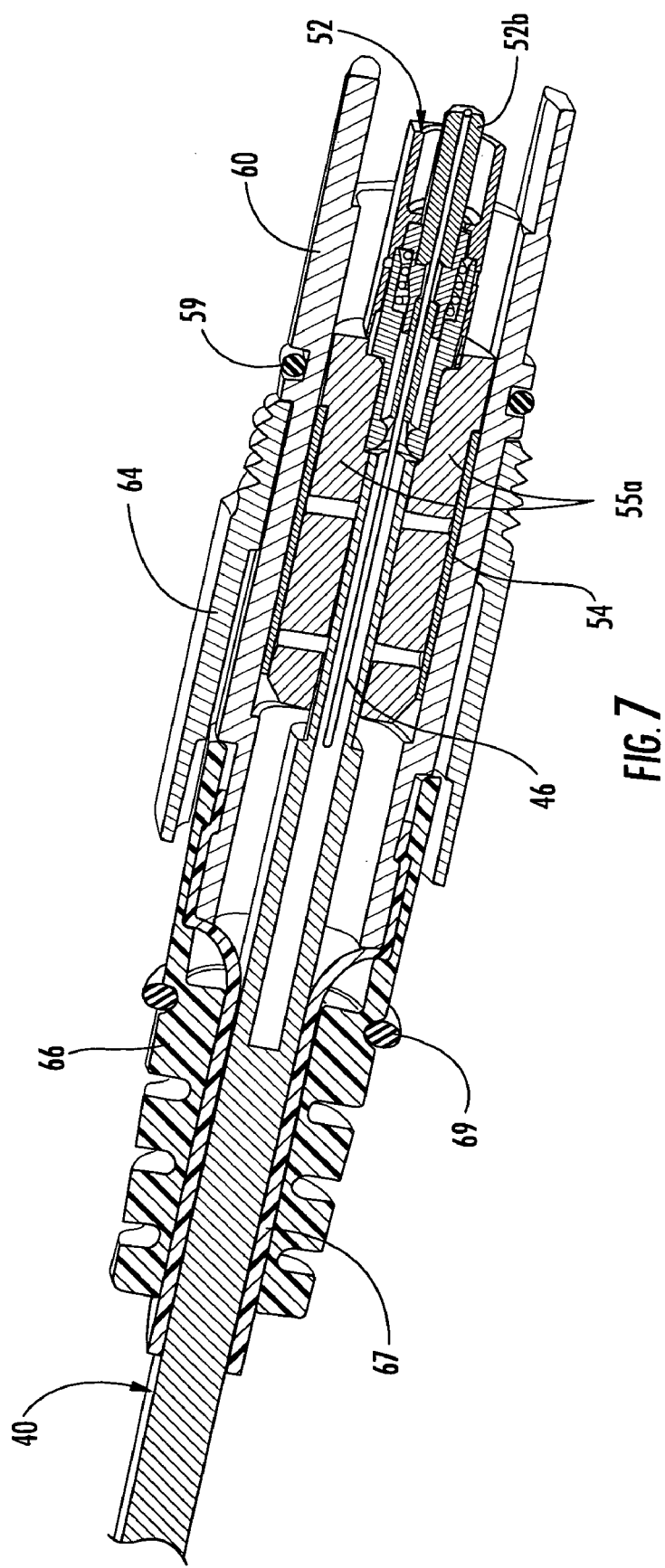

FIG. 7 is a cross-sectional view of the preconnectorized fiber optic drop cable taken along line 7—7 as shown in FIG. 4.

Figure 8:
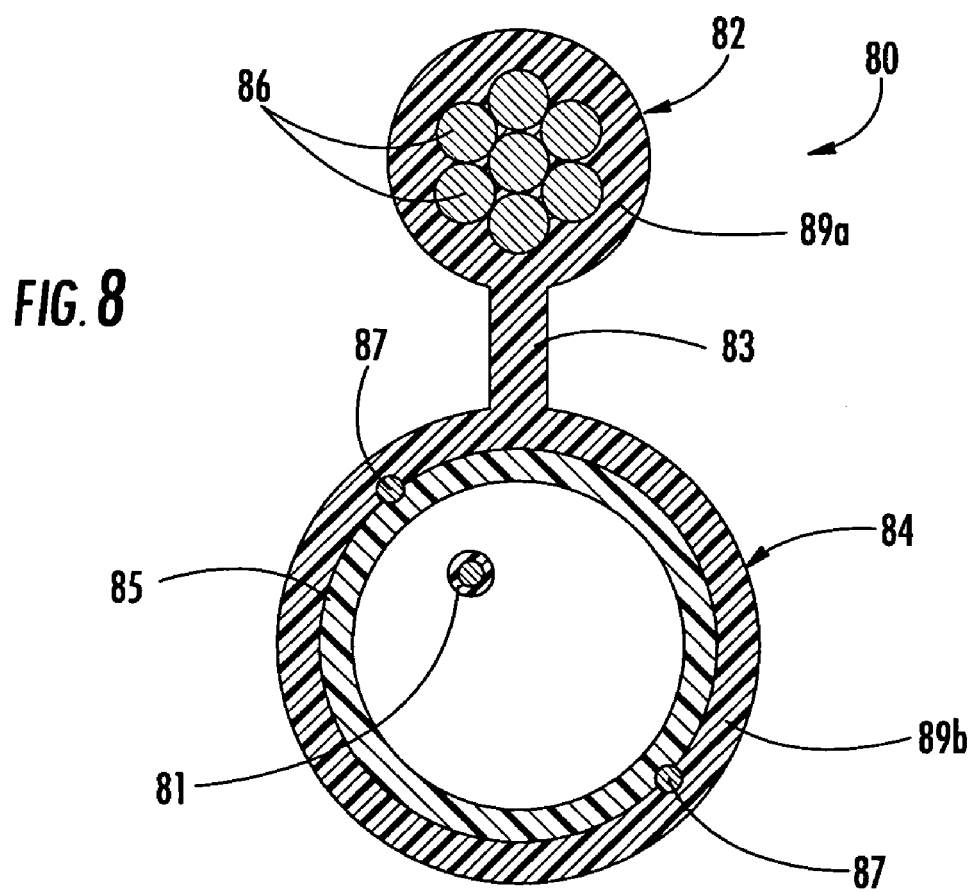

FIG. 8 is a cross-sectional view of another fiber optic drop cable according to the present invention.

δþFIG. 9 depicts a portion of a crimp housing that is suitable for the fiber optic drop cable shown in FIG. 8.

Figure 10:
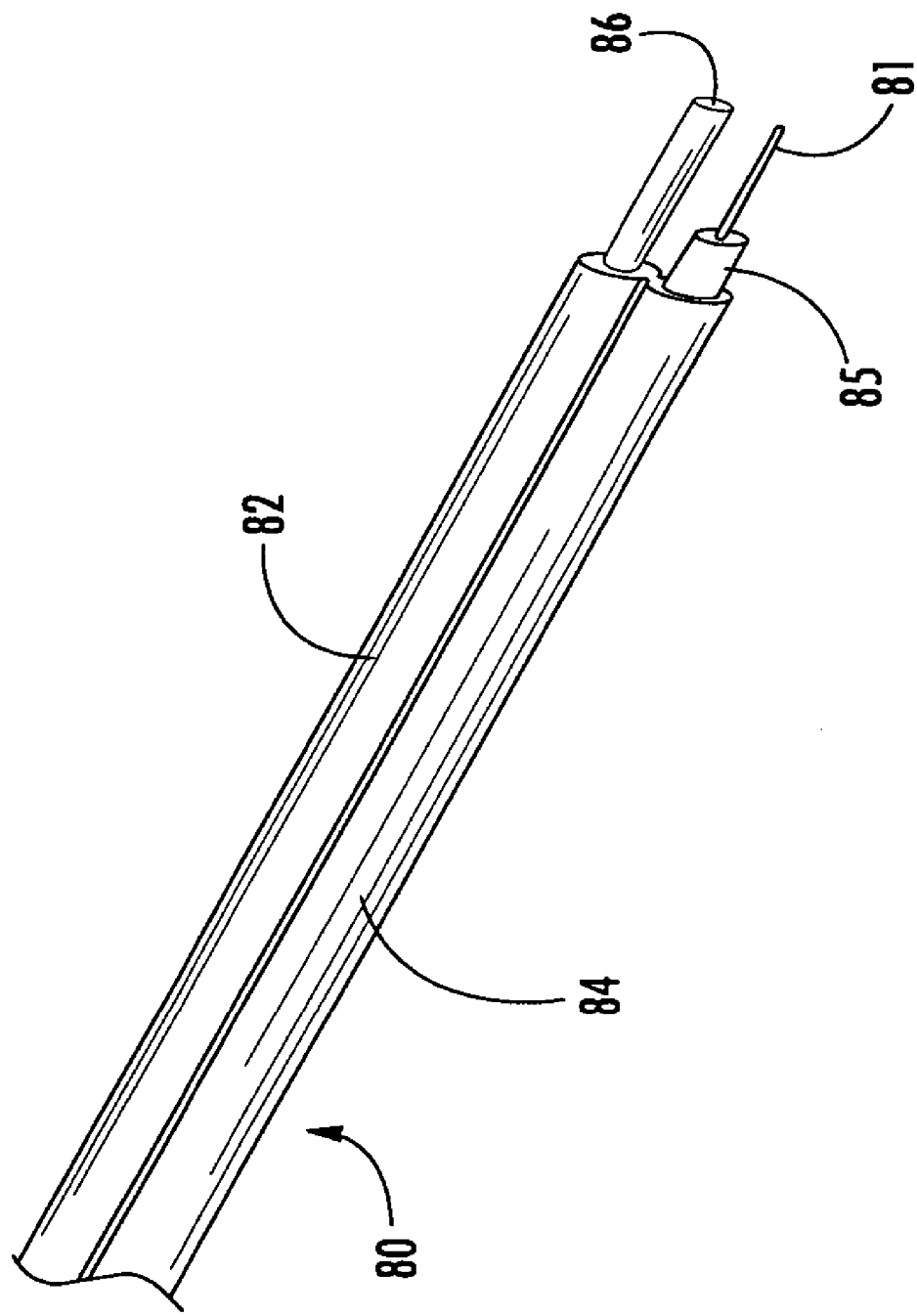

FIG. 10 is a perspective view of a cable similar to FIG. 8 prepared for connectorization.

Figure 11:
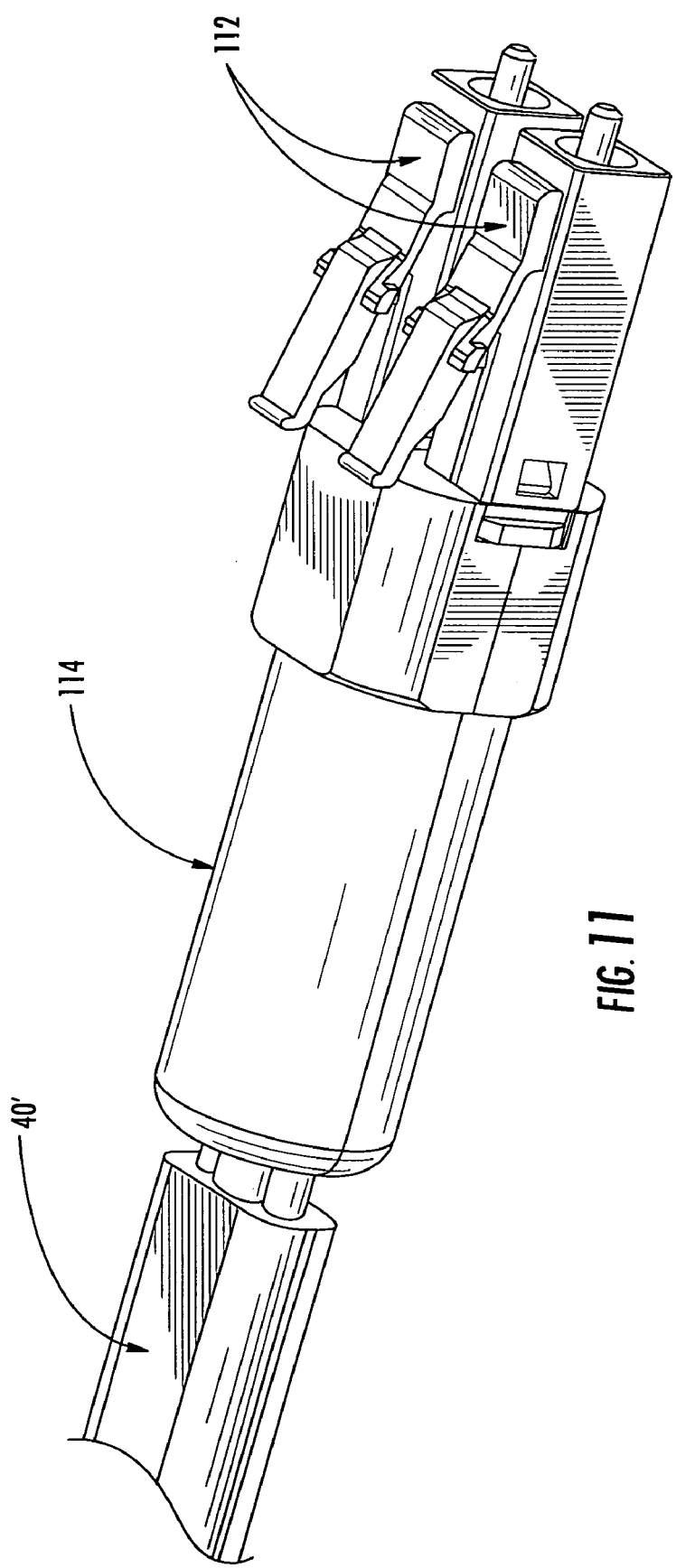

FIG. 11 shows a partially assembly crimp assembly being attached to a cable similar to the cable of FIG. 6 having more than one optical waveguide.

Figure 12:
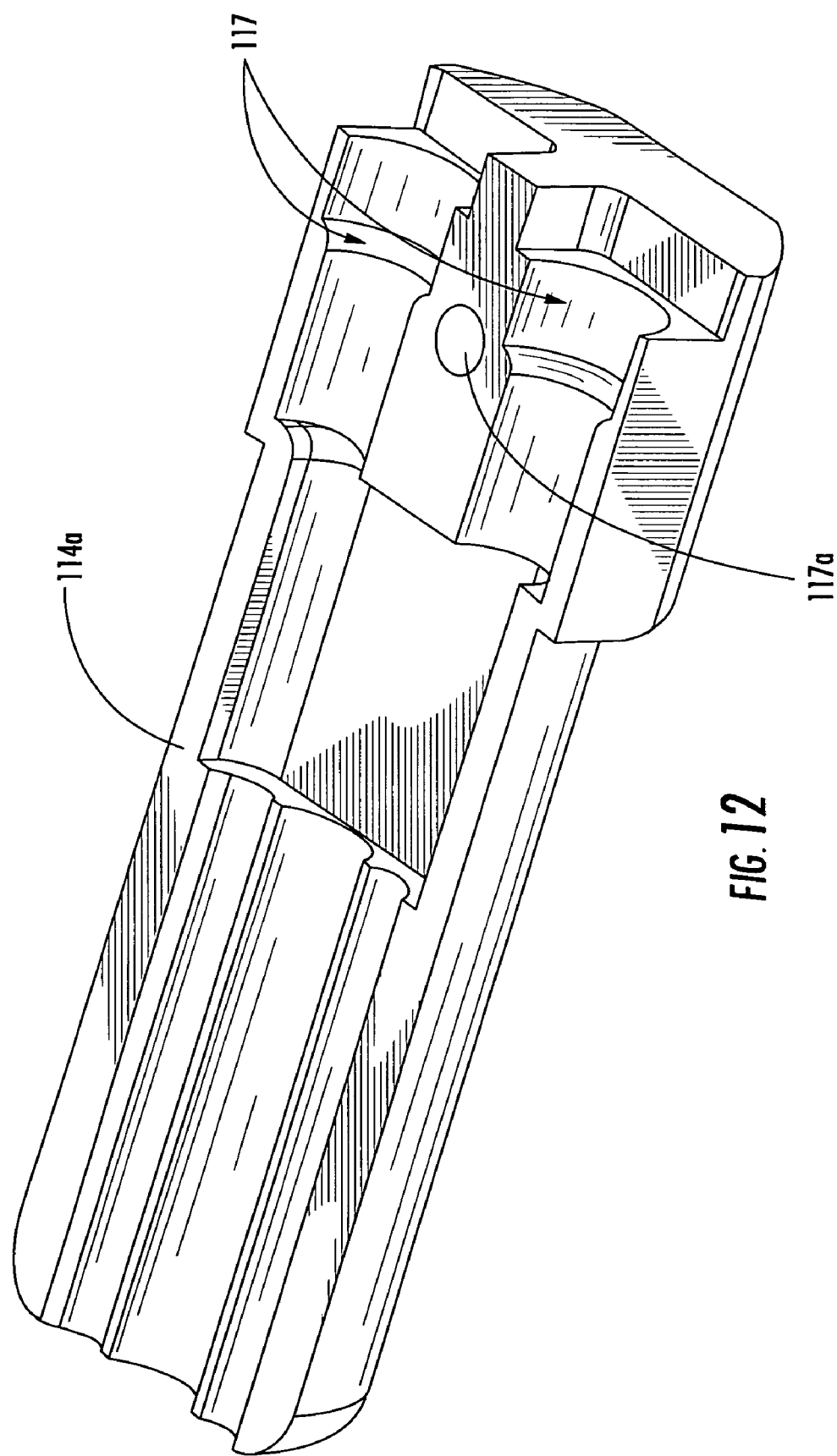

FIG. 12 is a perspective view of one half-shell of the crimp housing of FIG. 11.

Figure 13A:
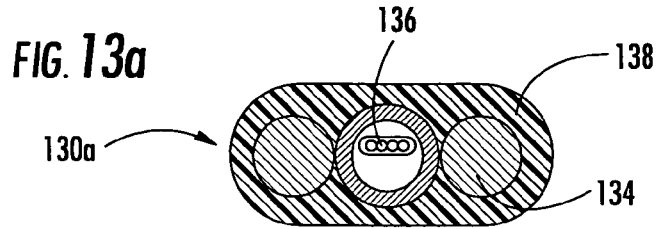
Figure 13B:
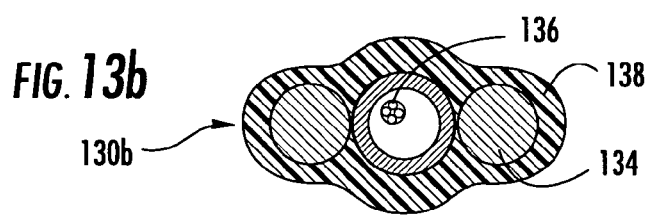
Figures 13C, 13D:
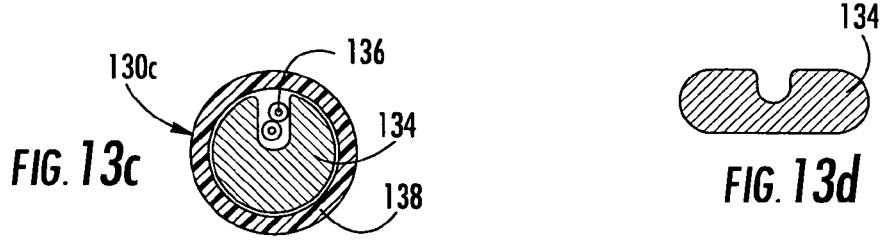
Figure 13E:
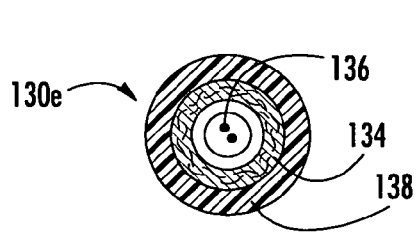
Figure 13F:
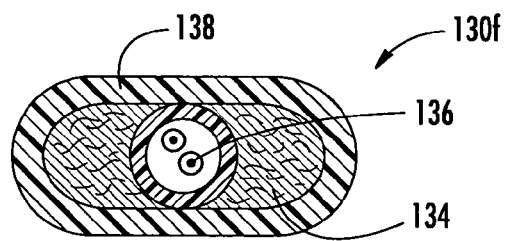
Figure 13G:
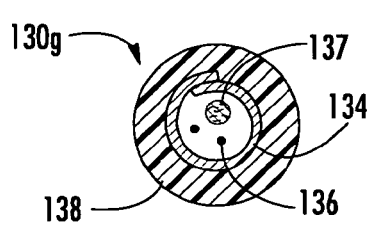
Figure 13H:
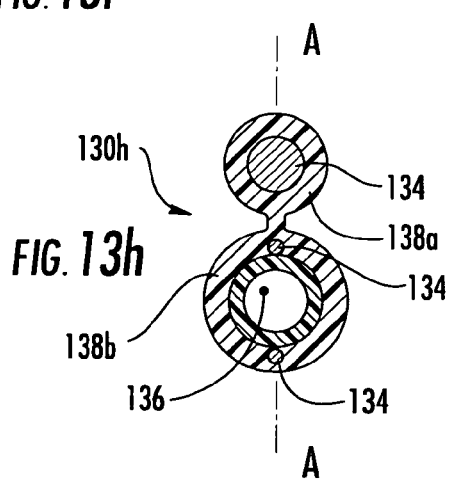
Figure 13I:
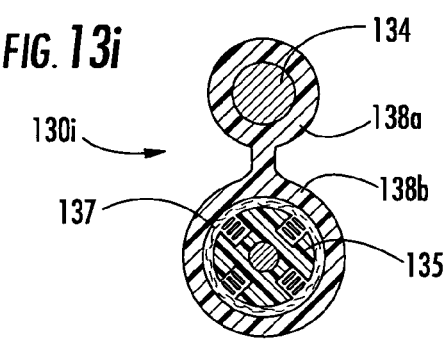
Figure 13J:
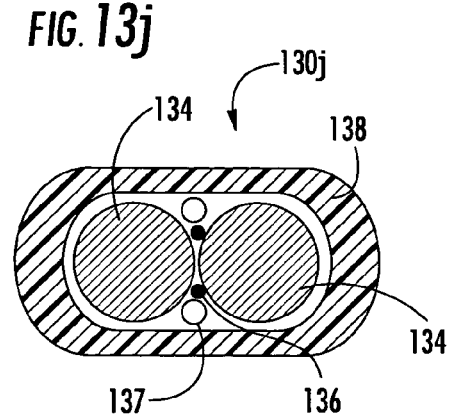
Figure 13K:
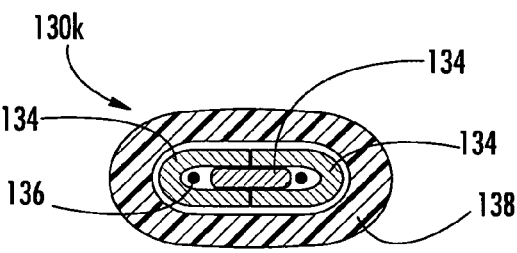
Figure 13L:
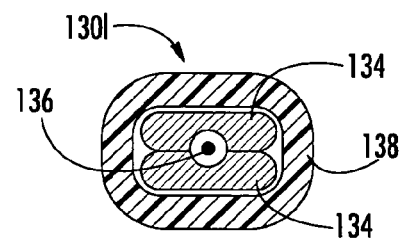
Figure 13M:
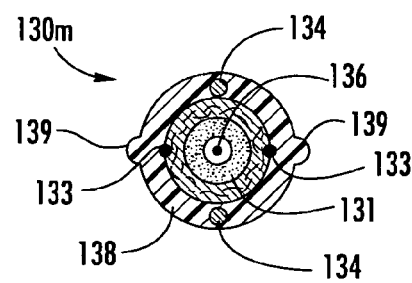
Figure 13N:
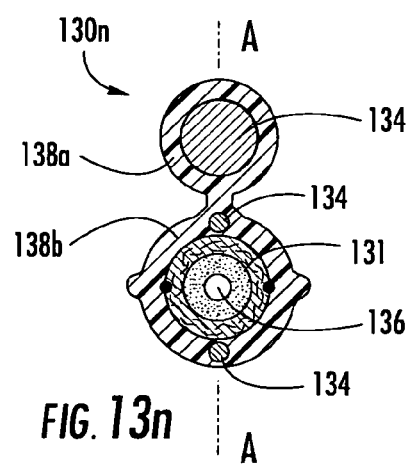

FIGS. 13a–13n depict cross-sectional views of other exemplary fiber optic cables that are suitable for preconnectorization according to the present invention.

Figure 14A:
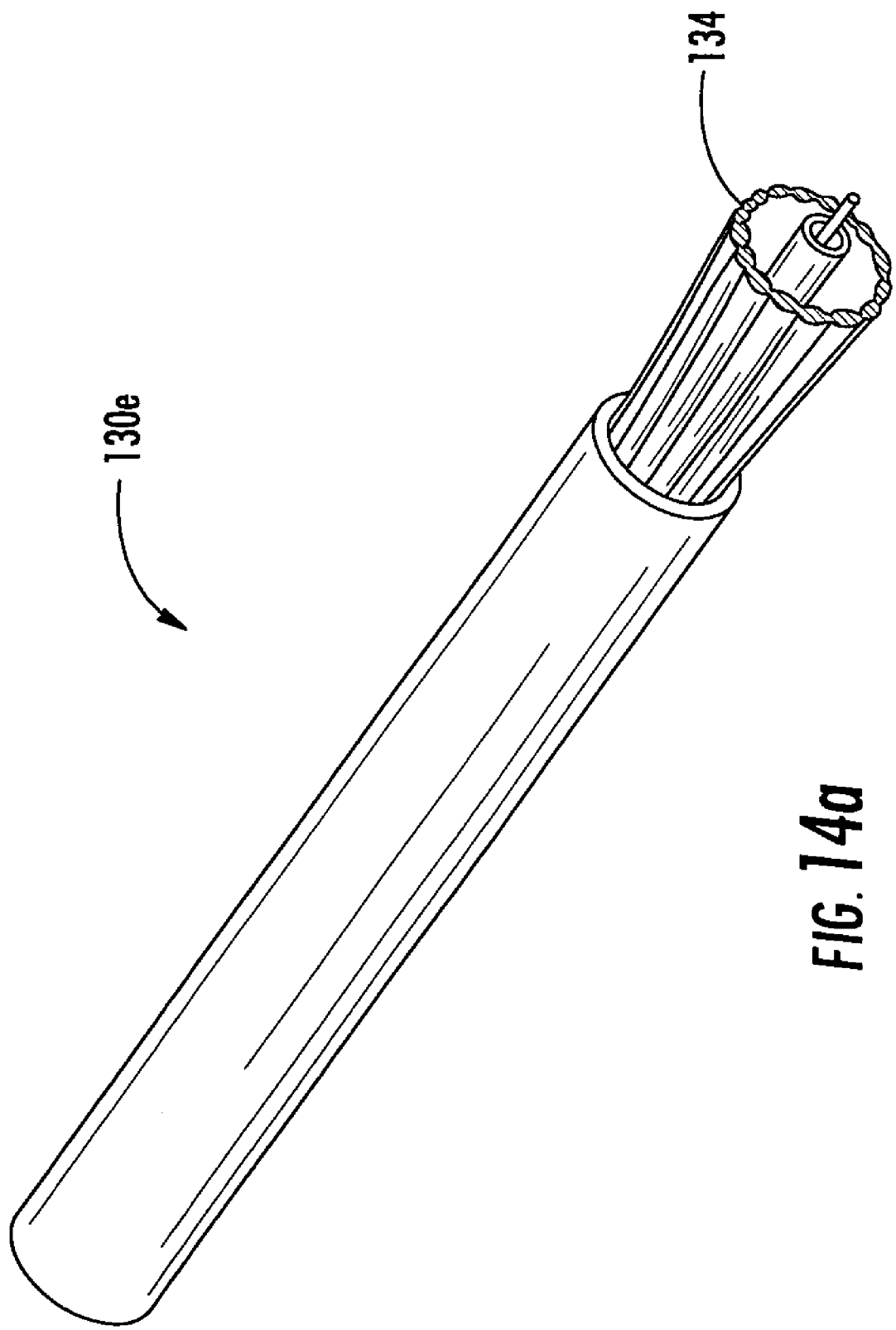
Figure 14B:
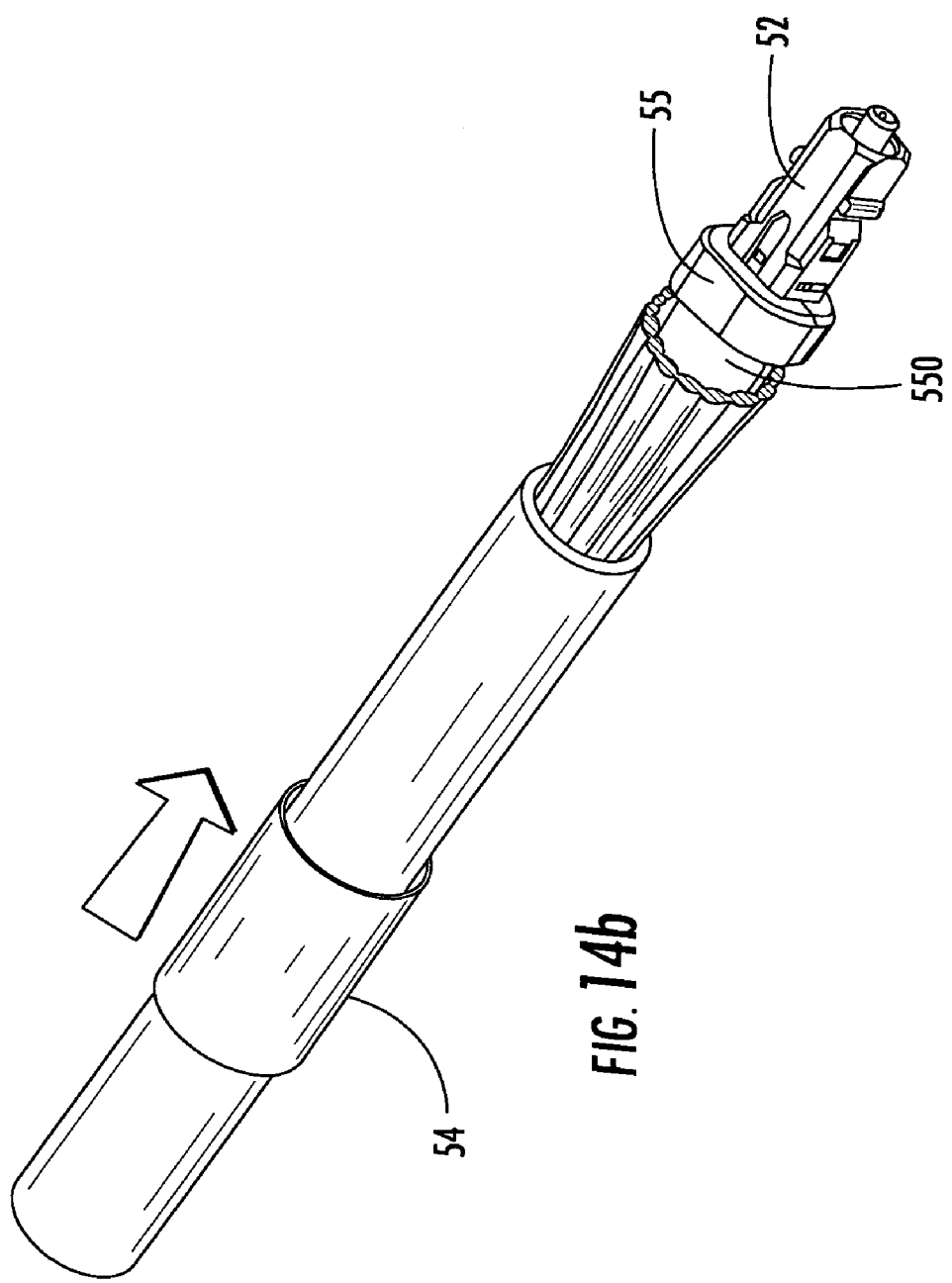

FIGS. 14a and 14b respectively show the cable of FIG. 13e prepared for connectorization and the same cable during the process of attaching the crimp assembly.

Figure 15A:
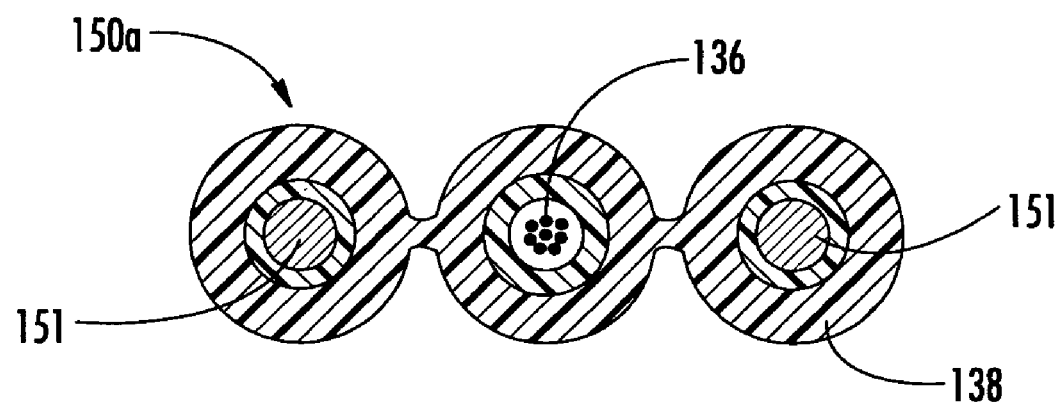
Figure 15B:
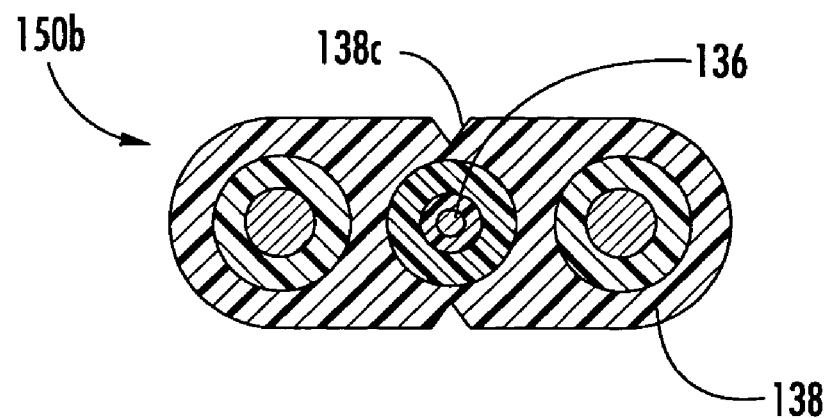

FIGS. 15a and 15b depict cross-sectional views of cables having at least one electrical conductor for transmitting electrical power.

DETAILED DESCRIPTION OF THE INVENTION

The present invention will now be described more fully hereinafter with reference to the accompanying drawings showing preferred embodiments of the invention. The invention may, however, be embodied in many different forms and should not be construed as limited to the embodiments set forth herein; rather, these embodiments are provided so that the disclosure will fully convey the scope of the invention to those skilled in the art. The drawing are not necessarily drawn to scale but are configured to clearly illustrate the invention.

Figure 1:
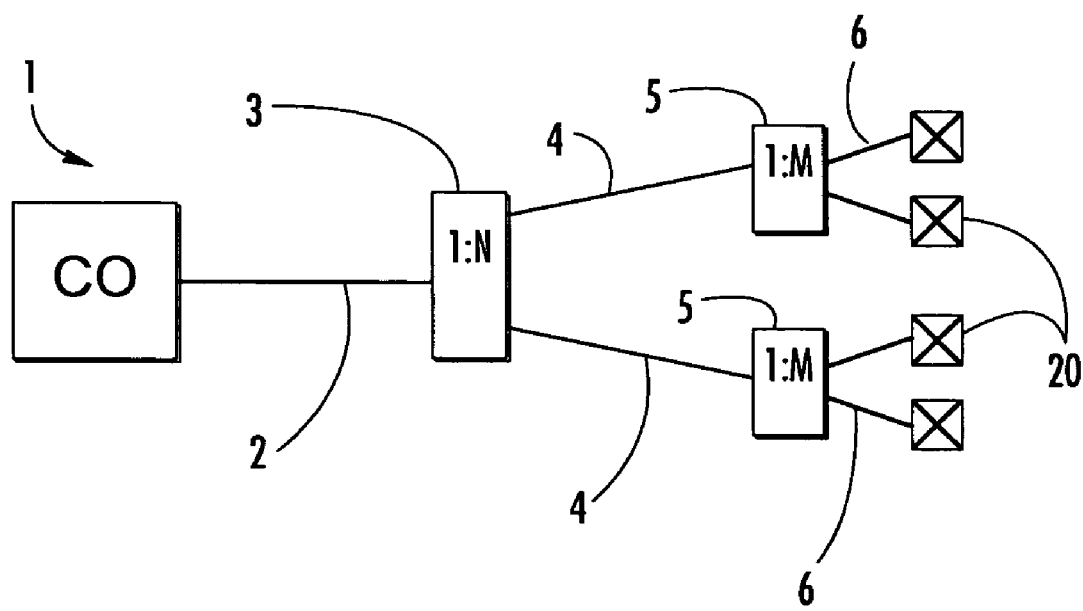

FIG. 1 schematically depicts a portion of an optical waveguide network 1 in an exemplary fiber to the location 'x' (FTTx). 'x' in the acronym represents the end location of the optical waveguide, for instance, FTTC is fiber to the curb. In this case, network 1 is a fiber to the premises (FTTP) application. FTTP architectures advantageously route at least one optical waveguide to the premises, thereby providing a high bandwidth connection to the subscriber. Applications to locations other than to the curb or premises are also possible. Downstream from a central office CO, network 1 includes a feeder link 2, a first 1:N splitter 3, a distribution link 4, a second 1:M splitter 5, and at least one drop link 6. In the present invention, drop link 6 comprises a preconnectorized fiber optic drop cable 10 (hereinafter preconnectorized cable) suitable for outdoor environments. Preconnectorized cable 10 effectively and economically streamlines the deployment and installation of optical waveguides into the last mile of the fiber optic network such as to the premises. Although, network 1 shows a simple configuration of one type of FTTX architecture, other networks can employ the present invention. Other networks may include other suitable components such as distribution closures, amplifiers, couplers, transducers, or the like. Likewise, other networks besides FTTx architectures can also benefit from the concepts of the present invention.

For explanatory purposes, FIG. 2 schematically illustrates two preconnectorized cables 10 and 10' being routed to a premises 20 using different exemplary techniques. Specifically, FIG. 2 shows first preconnectorized cable 10 being routed to premises 20 in an aerial application and second preconnectorized cable 10' being routed to premise 20 in a buried application. In the aerial application, a first end 10a of preconnectorized cable 10 is attached at a first interface device 12 located on pole 11 and a second end 10b of preconnectorized cable 10 is attached at interface device 14 located at the subscriber premises 20. In buried applications, the first and second ends of preconnectorized cable 10' are respectively connected to interface device 16 located inside pedestal 18 and interface device 14. The interface devices include at least one receptacle 30 for making the optical connection with an end of preconnectorized cable 10.

Figure 3C:
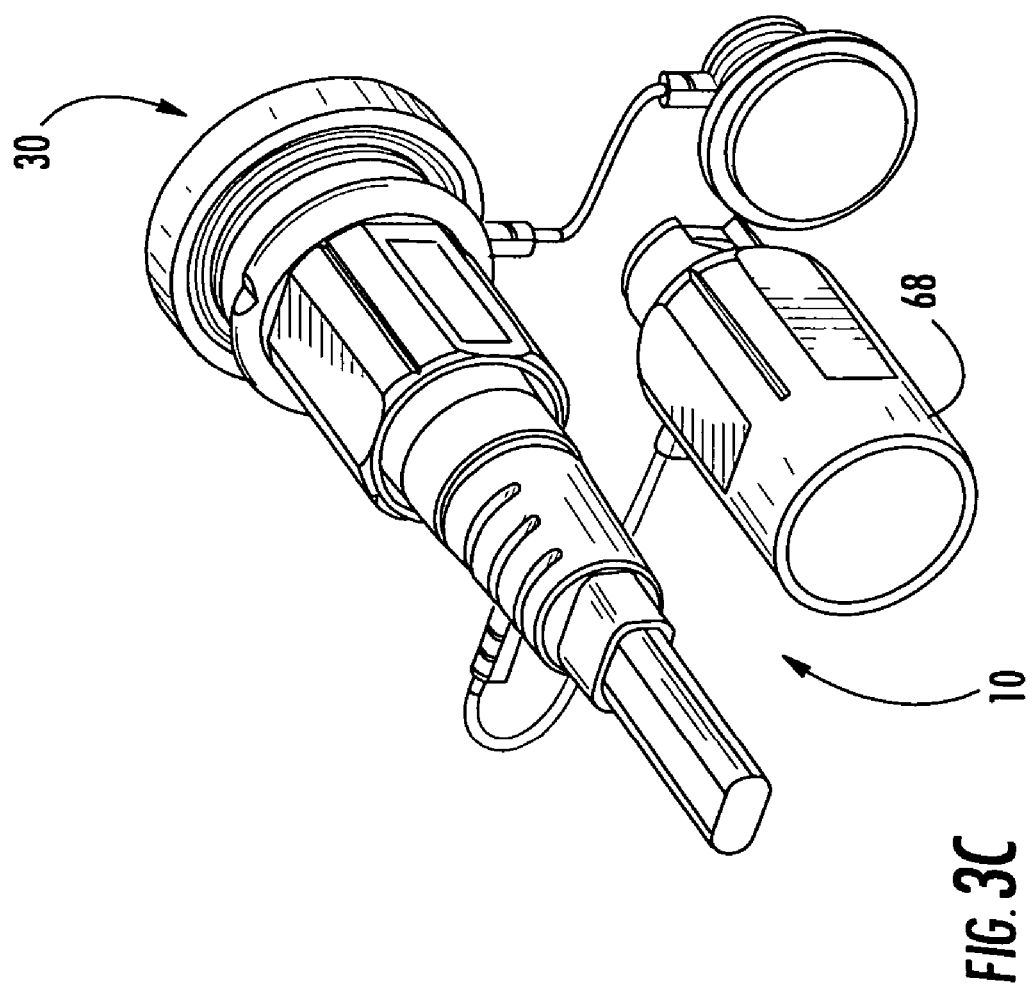

FIGS. 3a–c show the various stages during the mating of an end of preconnectorized cable 10 with receptacle 30. Specifically, FIG. 3a shows receptacle 30 detached from preconnectorized cable 10. Moreover, preconnectorized cable 10 and receptacle 30 are depicted with their respective protective caps on. Protective cap 68 is used for shielding a connector assembly 52, and in particular, the end face of a connector ferrule 52b from the elements and/or damage. Specifically, installed protective cap 68 isolates connector ferrule 52b from the elements and prevents it from being damaged during transportation and handling. FIG. 3b shows protective cap 68 removed from the end of preconnectorized cable 10. Likewise, the respective cap of receptacle 30 is also removed. Preconnectorized cable 10 is positioned to engage the complimentary portions of receptacle 30. Specifically, an alignment indicia 60c of preconnectorized cable 10 is positioned to its complementary indicia 30c of receptacle 30. FIG. 3c shows a mated connection between the preconnectorized cable 10 and receptacle 30, thereby making an optical connection therebetween. As readily apparent, no special equipment, training, or skill is required to make the optical connection. Thus, the labor cost of deploying the optical network to the premises is cost effective and efficient. In this case, the mating between the plug connector and the receptacle is secured using a threaded engagement, but other suitable means of securing the optical connection are possible. For instance, the securing means may use a quarter-turn lock, a quick release, a push-pull latch, or a bayonet configuration.

FIG. 4 depicts a perspective view of an assembled preconnectorized cable 10. Preconnectorized cable 10 includes a fiber optic cable 40 (hereinafter cable 40) as disclosed in U.S. Pat. No. 6,542,674 and an optical plug connector 50 mounted upon one end of cable 40. In this embodiment, cable 40 is a flat dielectric cable and optical plug connector 50 uses a connector assembly 52 of the SC type, but other types of connector assemblies such as LC, FC, ST, MT, and MT-RJ are contemplated by the present invention by using a suitable crimp housing.

As best shown in FIG. 6, cable 40 has an optical component 42, at least one strength component 44, and a jacket 48. In this case, strength component 44 has two glass-reinforced plastic (grp) strength components and optical component 42 has an optical waveguide 46 disposed within a buffer tube 43. Cable 40 also includes strength members 45 to provide additional tensile strength. As used herein, the term "strength component" means the strength element has anti-bucking strength, while the term "strength member" means a strength element lacks anti-buckling strength. Furthermore, the term "tensile element" means either a strength component or a strength member. Strength members 45 allow cable 40 to have a smaller cross-sectional footprint because they allow strength components 44 to have smaller diameters since they will not provide all of the tensile strength to cable 40. In other words, the tensile load is carried by both strength components 44 and strength members 45. Moreover, using strength members 45 maintains a relatively flexible outdoor cable that is easier to handle. Of course, other cables may be used with the concepts of the present invention and other exemplary cables will be discussed herein. Moreover, suitable connector assemblies may be used with suitable cables according to the concepts of the present invention, thereby resulting in numerous cable/connector combinations.

FIG. 5 depicts an exploded view of preconnectorized cable 10 showing cable 40 and plug connector 50. In this embodiment, plug connector 50 includes an industry standard SC type connector assembly 52 having a connector body 52a, a ferrule 52b in a ferrule holder (not numbered), a spring 52c, and a spring push 52d. Plug connector 50 also includes a crimp assembly (not numbered) that includes a crimp housing having at least one half-shell 55a and a crimp band 54, a shroud 60 having an O-ring 59, a coupling nut 64, a cable boot 66, a heat shrink tube 67, and a protective cap 68 secured to boot 66 by a wire assembly 69.

Generally speaking, most of the components of plug connector 50 are formed from a suitable polymer. Preferably, the polymer is a UV stabilized polymer such as ULTEM 2210 available from GE Plastics; however, other suitable materials are possible. For instance, stainless steel or any other suitable metal may be used for various components. Additionally, FIG. 7 shows a cross-sectional view of preconnectorized cable 10 taken along line 7—7 of FIG. 4.

As best shown in FIG. 6d, the crimp assembly includes crimp housing 55 and crimp band 54. Crimp housing 55 has two half-shells 55a that are held together by crimp band 54 when the preconnectorized cable is assembled. Although, the term half-shell is used, it is to be understood that it means suitable shells and includes shells that are greater than or less than half of the crimp housing. Crimp band 54 is preferably made from brass, but other suitable crimpable materials may be used. Crimp housing 55 is configured for securing connector assembly 52 as well as providing strain relief to cable 40. This advantageously results in a relatively compact connector arrangement using fewer components. Moreover, the crimp assembly allows preconnectorized cable 10 to be assembled quickly and easily. Of course, other embodiments are possible according to the present invention. For instance, connector body 52a may be integrally molded into crimp housing 55 in a ST type configuration so that a twisting motion of the crimp housing secures the ST-type connector with a complementary mating receptacle.

FIGS. 6a–6d depict several steps during the process of attaching the crimp assembly to cable 40. FIG. 6a shows cable 40 having strength members 45 (not visible) cut flush with the stripped back jacket 48, thereby exposing the two grp strength components 44 and optical component 42 from the end of cable 40. FIG. 6b shows the inner surface of one half-shell 55a. In this case, only one half-shell 55a is illustrated since two symmetrical half-shells are used for both halves of crimp housing 55. In other embodiments there may be a first half-shell and a second half-shell, which are different. For instance, one half-shell may have two alignment pins, rather than each half-shell having a single alignment pin.

As shown in FIG. 6b, half-shell 55a includes a first end 55b for securing connector assembly 52 and a second end 55c that provides strain relief. A longitudinal axis A—A is formed between first end 55b and second end 55c near the center of crimp housing 55, through which half of a longitudinal passage is formed. When assembled, optical fiber 46 passes through the longitudinal passage and is held in a bore of ferrule 52b. Additionally, half-shell 55a includes a cable clamping portion 56 and a connector assembly clamping portion 57.

Cable clamping portion 56 has two outboard half-pipe passageways 56a and a central half-pipe passageway 56b that is generally disposed along longitudinal axis A—A. Half-pipe passageways 56a and 56b preferably include at least one rib 56c for securely clamping optical component 42 and strength components 44 after crimp band 54 is crimped, thereby completing the crimp assembly. Moreover, half-pipe passageways 56a and 56b are sized for the components of cable 40, but the passageways can be sized for different cable configurations.

Likewise, half-shell 55a has a connector assembly clamping portion 57 that is sized for attaching connector assembly 52. Specifically, connector assembly clamping portion 57 has a half-pipe passageway 57a that opens into and connects central half-pipe passageway 56b and a partially rectangular passageway 57b. Half-pipe passageway 57a is sized for securing spring push 52d and may include one or more ribs for that purpose. Rectangular passageway 57b holds a portion of connector body 52a therein and inhibits the rotation between connector assembly 52 and the crimp assembly. FIG. 6c depicts prepared cable 40 of FIG. 6a having connector assembly 52 attached and positioned in a first half-shell 55a. The alignment of the two half shells is accomplished by inserting pins 57c into complementary bores 57d of the two half-shells. FIG. 6d shows both half-shells 55a of crimp housing 55 disposed about cable 40 before crimp band 54 is installed thereover. Additionally, half-shells may include one or more bores 56d that lead to one of half-pipe passageways 56a or 56b. Bores 56d allow for inserting an adhesive or epoxy into the crimp housing 55, thereby providing a secure connection for strain relief.

As shown in FIG. 7, when fully assembled the crimp assembly fits into shroud 60. Additionally, crimp housing 55 is keyed to direct the insertion of the crimp assembly into shroud 60. In this case, half-shells 55a include planar surfaces 57e (FIG. 6d) on opposites sides of crimp housing 55 to inhibit relative rotation between crimp housing 55 and shroud 60. In other embodiments, the crimp assembly may be keyed to the shroud using other configurations such as a complementary protrusion/groove or the like.

Shroud 60 has a generally cylindrical shape with a first end 60a and a second end 60b. Shroud generally protects connector assembly 52 and in preferred embodiments also keys plug connector 50 with the respective mating receptacle 30. Moreover, shroud 60 includes a through passageway between first and second ends 60a and 60b. As discussed, the passageway of shroud 60 is keyed so that crimp housing 54 is inhibited from rotating when plug connector 50 is assembled. Additionally, the passageway has an internal shoulder (not numbered) that inhibits the crimp assembly from being inserted beyond a predetermined position.

As best shown in FIGS. 5a and 5b, first end 60a of shroud 60 includes at least one opening (not numbered) defined by shroud 60. The at least one opening extends from a medial portion of shroud 60 to first end 60a. In this case, shroud 60 includes a pair of openings on, opposite sides of first end 60a, thereby defining alignment portions or fingers 61a, 61b. In addition to aligning shroud 60 with receptacle during mating, alignment fingers 61a, 61b may extend slightly beyond connector assembly 52, thereby protecting the same. As shown in FIG. 5b, alignment fingers 61a, 61b have different shapes so plug connector 50 and receptacle 30 only mate in one orientation. In preferred embodiments, this orientation is marked on shroud 60 using alignment indicia 60c so that the craftsman can quickly and easily mate preconnectorized cable 10 with receptacle 30. In this case, alignment indicia 60c is an arrow molded into the top alignment finger of shroud 60, however, other suitable indicia may be used. As shown, the arrow is aligned with complimentary alignment indicia 30c disposed on receptacle 30, thereby allowing the craftsman to align indicia 60c, 30c so that alignment fingers 61a, 61b can be seated into receptacle 30. Thereafter, the craftsman engages the external threads of coupling nut 64 with the complimentary internal threads of receptacle 30 to make the optical connection as shown in FIG. 3c.

A medial portion of shroud 60 has a groove 62 for seating an O-ring 59. O-ring 59 provides a weatherproof seal between plug connector 50 and receptacle 30 or protective cap 68. The medial portion also includes a shoulder 60d that provides a stop for coupling nut 64. Coupling nut 64 has a passageway sized so that it fits over the second end 60b of shroud 60 and easily rotates about the medial portion of shroud 60. In other words, coupling nut 64 cannot move beyond shoulder 60d, but coupling nut 64 is able to rotate with respect to shroud 60. Second end 60b of shroud 60 includes a stepped down portion having a relatively wide groove (not numbered). This stepped down portion and groove are used for securing heat shrink tubing 67. Heat shrink tubing 67 is used for weatherproofing the preconnectorized cable. Specifically, the stepped down portion and groove allow for the attachment of heat shrink tubing 67 to the second end 60b of shroud 60. The other end of heat shrink tubing 67 is attached to cable jacket 48, thereby inhibiting water from entering plug connector 50.

After the heat shrink tubing 67 is attached, boot 66 is slid over heat shrink tubing 67 and a portion of shroud 60. Boot 66 is preferably formed from a flexible material such as KRAYTON. Heat shrink tubing 67 and boot 66 generally inhibit kinking and provide bending strain relief to the cable near plug connector 50. Boot 66 has a longitudinal passageway (not visible) with a stepped profile therethrough. The first end of the boot passageway is sized to fit over the second-end of shroud 60 and heat shrink tubing 67. The first end of the boot passageway has a stepped down portion sized for cable 40 and the heat shrink tubing 67 and acts as stop for indicating that the boot is fully seated. After boot 66 is seated, coupling nut 64 is slid up to shoulder 60c so that wire assembly 69 can be secured to boot 66. Specifically, a first end of wire assembly 69 is positioned about groove 66a on boot 66 and wire 69a is secured thereto using a first wire crimp (not numbered). Thus, coupling nut 64 is captured between shoulder 60c of shroud 60 and wire assembly 69 on boot 66. This advantageously keeps coupling nut 64 in place by preventing it from sliding past wire assembly 69 down onto cable 40.

A second end of wire assembly 69 is secured to protective cap 68 using a second wire crimp (not numbered). Consequently, protective cap 68 is prevented from being lost or separated from preconnectorized cable 10. In this embodiment, wire assembly 69 is attached to protective cap 68 at an eyelet 68a. Eyelet 68a is also useful for attaching a fish-tape so that preconnectorized cable 10 can be pulled through a duct. Protective cap 68 has internal threads for engaging the external threads of coupling nut 64. Moreover, O-ring 59 provides a weatherproof seal between plug connector 50 and protective cap 68 when installed. When threadly engaged, protective cap 68 and coupling nut 64 may rotate with respect to the remainder of preconectorized cable 10, thus inhibiting torsional forces during pulling.

Preconnectorized cable 10 may have any suitable length desired, however, preconnectorized cable 10 can have standardized lengths. Moreover, preconnectorized cable 10 may include a length marking indicia for identifying its length. For instance, the length marking indicia may be a marking located on cable 40 such as a colored stripe or denoted in a print statement. Likewise, the length marking indicia may be a marking located on plug connector 50. In one embodiment, length marking indicia may be denoted by a marking on coupling nut 64 or protective cap 68 such as a colored stripe. In any event, the length marking indicia should be easily visible so the craftsperson may identify the preconnectorized cable length. For instance, a red marking indicia on coupling nut 64 denotes a length of about 50 feet while an orange marking indicia denotes a length of about 100 feet.

The described explanatory embodiment provides an optical connection that can be made in the field without any special tools, equipment, or training. Additionally, the optical connection is easily connected or disconnected by merely mating or unmating the ends of preconnectorized cable 10 with the respective receptacle by threadly engaging or disengageing coupling nut 64. Thus, the preconnectorized cables of the present invention allow deployment of optical waveguides to the location 'x' in an easy and economical manner, thereby providing the end user with increased bandwidth. Furthermore, the concepts of the present invention can be practiced with other fiber optic cables, connectors and/or other preconnectorized cable configurations.

FIG. 8 is a cross-sectional view of another fiber optic cable 80 suitable with the concepts of the present invention. Cable 80 is an explanatory figure eight cable design having a messenger section 82 and a carrier section 84 connected by a web 83. Messenger section 82 includes at least one strength component 86 having anti-buckling strength and tensile strength for carrying a load. Strength component 86 can be formed from any suitable material such as dielectrics or conductors, moreover, a plurality of strength components 86 may be stranded together as shown. In this cable, carrier section 84 includes an optical component that includes at least one optical waveguide 81 and a buffer tube 85, and generally excludes strength components and strength members. However, preconnectorized cables of the present invention may use figure eight cables having strength components and/or strength members in the carrier section. The messenger and carrier sections 82,84 include a common cable jacket 89. Common jacket 89 includes a messenger jacket 89a and a carrier jacket 89. Additionally, carrier section 84 also includes at least one ripcord 87 for accessing optical waveguide 81.

Figure 9:
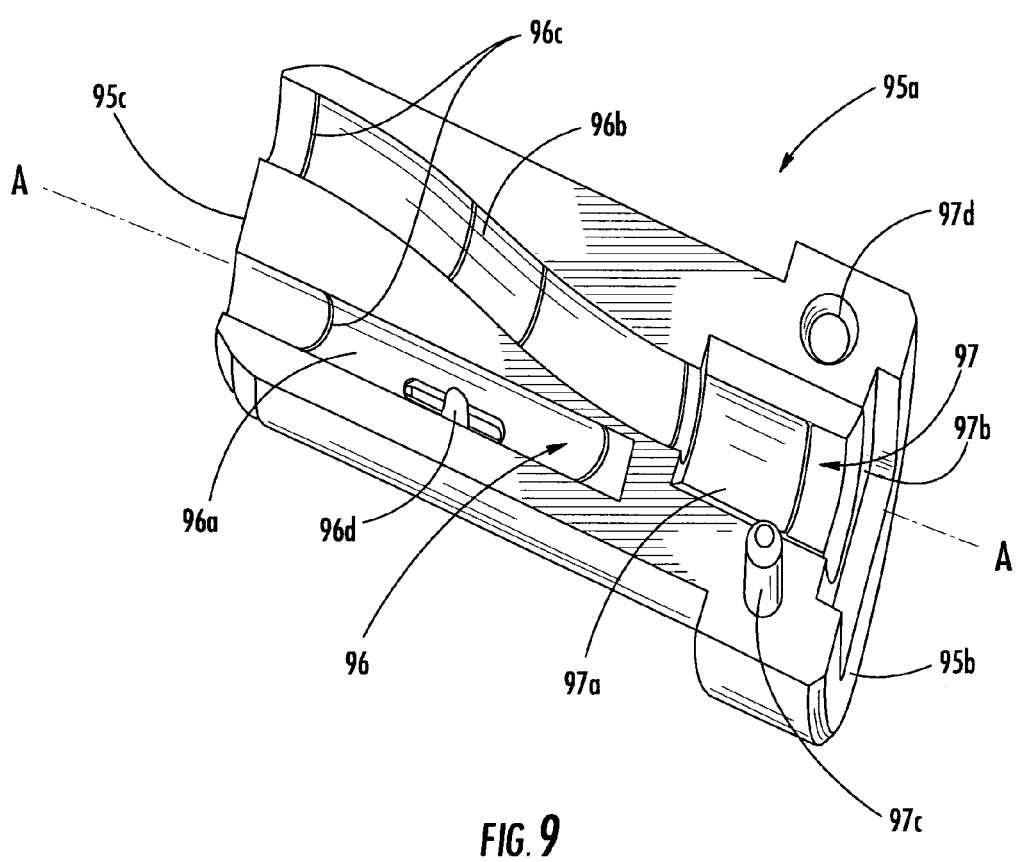

A preconnectorized cable employing cable 80 uses a design similar to preconnectorized cable 10, but some of the components are different due to the figure eight design of cable 80. Specifically, cable 80 requires a different crimp housing than used for cable 40. FIG. 9 illustrates a half-shell 95a that is suitable for using as a portion of the crimp housing for preconnectorizing cable 80. Generally speaking, half-shell 95a has the same outer dimensions as half-shell 55a so by merely substituting crimp housings different cable designs may be used with plug connector 50. Like crimp housing 55, crimp housing 95 uses two symmetrical half-shells 95a, thus only one half-shell requires illustration. In this case, passageway 96b is not symmetric about longitudinal axis A—A. Instead, passageway 96a has a non-symmetrical curvilinear path between first end 95b and second end 95c about longitudinal axis A—A. Furthermore, embodiments of the present invention may use crimp housings having other configurations for different cables.

FIG. 10 illustrates fiber optic cable 80 having an end prepared for connectorization. Specifically, a portion of jacket 89 is stripped back, thereby exposing strength component 86, buffer tube 85, and optical waveguide 81. Next, connector assembly 52 is attached to optical waveguide 81 forming a subassembly. Thereafter, the subassembly is placed into the proper portions of half-shell 95a. Like half-shell 55, half-shell 95a includes a cable clamping portion 96 and a connector assembly clamping portion 97. Crimp housing 95 (not shown) is then formed about a portion of the subassembly by placing a second half-shell 95a onto the first half-shell 95a.

Specifically, half-shell 95a includes a first end 95b for securing connector assembly 52 and a second end 95c that provides strain relief. A longitudinal axis A—A is formed between first end 95b and second end 95c near the center of the crimp housing. A through longitudinal passage is formed between first ends 95b and second ends 95c of crimp housing 95; however, the passageway is not generally symmetrical about longitudinal axis A—A. When assembled, optical fiber 81 passes through the longitudinal passage and is held in a bore of ferrule 52b. Cable clamping portion 96 has a single half-pipe passageway 96a and a curvilinear half-pipe passageway 96b. Half-pipe passageways 96a and 96b preferably include a plurality of ribs 96c for securely clamping buffer tube 85 and strength component 86 after crimp band 54 is crimped about crimp housing 95, thereby completing the crimp assembly.

Likewise, half-shell 95a has a connector assembly clamping portion 97 that is sized for attaching connector assembly 52. Specifically, connector assembly clamping portion 97 has a half-pipe passageway 97a that opens into and connects curvilinear half-pipe passageway 96b and a partially rectangular passageway 97b. Half-pipe passageway 97a is sized for securing spring push 52d and may include one or more ribs for that purpose. Rectangular passageway 97b holds a portion of connector body 52a therein and inhibits the rotation between connector assembly 52 and the crimp assembly. The alignment of the two half shells 95a is accomplished by inserting pins 97c into complementary bores 97d of the two half-shells. Additionally, half-shells 95a may include one or more bores 96d that lead to one of half-pipe passageways for inserting an adhesive or epoxy into the crimp housing.

Preconnectorized cables of the present invention can also terminate more than one optical waveguide. A plurality of optical waveguide can be arranged loosely, disposed in a ribbon, or bundlized. For instance, FIG. 11 depicts a cable 40' having more than one optical waveguide therein. As shown, a crimp housing 114 is suitable for securing more than one connector assembly 112. As depicted in FIG. 12, half-shell 114a has two connector assembly clamping portions 117. Moreover, the half-shell shells of crimp housing 114 are non-symmetrical since half-shell 114a has a bore 117a and the complementary half-shell (not shown) would have an alignment pin. Furthermore, crimp housings of the present invention may hold one or more multi-fiber ferrules.

Likewise, a variety of different cables can be used with the present invention. For instance, FIGS. 13a–13n depict suitable cables 130a–130n having at least one strength component or strength member 134, at least one optical waveguide 136, and a cable jacket 138. Cables 130a–130n will be briefly described. Additionally, all of the disclosures of the below mentioned patents and patent applications are incorporated herein by reference.

FIG. 13a shows a cable 130a disclosed in U.S. Pat No. 6,501,888 that is similar to cable 40. Among other features, cable 130a does not include strength members 45 that lack anti-buckling strength. Additionally, optical waveguide 136 is a portion of an optical fiber ribbon. FIG. 13b is another similar cable design, but jacket 138 has a medial lobe surrounding a tube that houses optical waveguides 136, which are disposed in a bundle. FIG. 13c shows a round cable 130c as disclosed in U.S. patent application Ser. No. 09/822,528 and Ser. No. 09/822,529 both filed on Mar. 30, 2001. Additionally, optical waveguide 136 has a buffer layer (not numbered) for protection. FIG. 13d depicts a variation of the strength component 134 of cable 130c for a flat drop cable.

FIG. 13e is a round cable 130e having a plurality of strength members 134 such as aramid fibers or fiberglass rovings. As shown in FIGS. 14a and 14b, strength members 134 of cable 130e are secured to plug connector 50 by being captured between an outer barrel 55o of crimp housing 55 and the inner diameter of crimp band 54 during crimping. Specifically, FIG. 14a shows a cable 130e prepared for connectorization and FIG. 14b shows strength members 134 being positioned about outer barrel 55o before installing crimp band 54. Of course other techniques are possible for securing strength members 134, but using this technique allows one configuration of crimp housing 55 to accommodate several different types of cables. Cable 130f is a variation of cable 130e having a generally flat shape. Thus, part of the passageway through the boot of the plug connector 50 should conform with the cable profile, thereby allowing the boot to be slid onto the cable.

FIG. 13g depicts yet another cable 130g as disclosed in U.S. Pat. No. 6,256,438. In this cable, strength component 134 is an armor tube that houses optical waveguides 136 and water-swellable element 137 such as a water-swellable yarn. FIG. 13h shows another figure-eight cable as disclosed in U.S. Pat. No. 6,356,690. Cable 130h includes strength components 134 in both the messenger and carrier sections. The primary strength is provided by the strength component of the messenger section, but the strength components of the carrier section generally inhibit shrinkback of carrier jacket 138b when the two sections are separated. Moreover, strength components 134 in the carrier section are generally located along plane A—A. FIG. 13i shows cable 130i, which is another variation of a figure-eight cable. In this cable, a slotted core 135 is used for holding optical ribbons in a plurality of stacks, but other configurations are possible. Slotted core 135 is wrapped with a water-swellable element 137 such as a tape, which is secured with one or more binder threads before jacket is extruded thereover.

FIG. 13j shows cable 130j as disclosed in U.S. Pat. No. 6,621,964. Cable 130j includes two non-stranded strength components 134 with optical waveguides 136 and water-swellable components 137 surrounded by jacket 138. FIG. 13k illustrates cable 130k as also disclosed in U.S. Pat. No. 6,621,964. Cable 130k has inner and outer components that may be strength components 134 that house at least one optical waveguide 136 generally surrounded by a jacket 138. FIG. 13l shows cable 130l as disclosed in U.S. Pat. No. 6,618,526. Cable 130l has two strength components 134 that share two or more interfaces with a retention area therebetween that houses optical waveguide 136.

FIGS. 13m and 13n show cables 130m and 130n having a dry insert 131 as disclosed in U.S. patent application Ser. Nos. 10/326,022 filed on Dec. 19, 2002 and 10/661,204 filed on Sep. 12, 2003. Additionally, cables 13m and 13n are tubeless cable designs. In other words, the craftsman does not have to open a buffer tube to access the optical waveguides. Cable 130m includes optical waveguides 136 generally disposed within dry insert 131, and one or more binder threads that secure dry insert 131, two strength components 134, and jacket 138. Cable 130m also has a pair of ripcords 133 disposed about 180 degrees apart. Cable jacket 138 includes a plurality of ears 139 that are generally disposed to indicate the location of ripcords 133 to the craftsman. FIG. 13n shows a figure-eight cable 130n that is similar to cable 130m, except it includes a messenger section connected by a web. Likewise, other cable design may use a dry insert and/or have a tubeless configuration. The illustrated cables may also include other components, configurations, and/or different materials. For instance cables can include components such as armor layers, ripcords, water-swellable yarns, tapes, or powders. Optical waveguide can also be loose, ribbonized, or have buffer layers.

Additionally, the preconnectorized cables according to the present invention may also have electrical power components that are connected and disconnected through the plug connector. FIGS. 15a and 15b depict cables 150a and 150b that are suitable for carrying electrical power. Cable 150a has insulated electrical wires 151 located in outboard lobes of jacket 138. Cable 150b also includes electrical wires 151 on the outboard portions surrounded by jacket 138 having preferential tear portions 138c. Electrical wires 151 are also multi-functional since they act as strength components in these cable designs. Electrical wires 151 may be any suitable electrical conductor such as copper wires or copper clad steel. In the preconnectorized cable, electrical wires 151 would be electrically connected with respective conductive terminals of the plug connector that are suitable for mating with complementary electrical terminals in the receptacle. For instance, electrical wires 151 may be in electrical communication with a portion of a conductive terminal. For instance, the electrical terminal may run from electrical wire 151 in the half shell to the connector assembly 52 or adjacent to fingers 61a, 61b; however, other suitable configurations are possible.

Many modifications and other embodiments of the present invention, within the scope of the appended claims, will become apparent to a skilled artisan. Additionally, the present invention can include other suitable configurations, hybrid designs, structures and/or equipment. Therefore, it is to be understood that the invention is not limited to the specific embodiments disclosed herein and that modifications and other embodiments may be made within the scope of the appended claims. Although specific terms are employed herein, they are used in a generic and descriptive sense only and not for purposes of limitation. The invention has been described with reference to drop cables having FTTx applications, but the inventive concepts of the present invention are applicable to other suitable applications.

That which is claimed:

1. A preconnectorized outdoor cable comprising:
at least two strength components having respective tensile strength ratings, an optical transmission component, and at least one tensile strength member having a tensile strength rating disposed generally adjacent to at least one of the strength components, the strength member and one of the strength components defining a tensile strength rating ratio of about 0.1 to about 0.3, and a cable jacket generally surrounding the at least two strength components, the optical transmission component, and the at least one tensile strength member; and
at least one plug connector, the at least one plug connector being attached to an end of the cable, thereby connectorizing an optical waveguide, the optical waveguide being a portion of the optical transmission component, wherein the at least one plug connector includes a crimp housing and a connector assembly, the crimp housing having two half-shells that secure a portion of the connector assembly therebetween where the connector assembly includes a ferrule and a connector housing.

2. The preconnectorized outdoor cable of claim 1, the crimp housing being a portion of a crimp assembly that includes a crimp band for holding the crimp housing together.

3. The preconnectorized outdoor cable of claim 2, the two half-shells having a longitudinal passageway therethrough and at least one cable clamping portion, the at least one cable clamping portion securing one of the at least two strength components of the cable therein.

4. The preconnectorized outdoor cable of claim 1, two half shells having a longitudinal passageway therethrough for routing the at least one optical waveguide to the connector assembly, and the two half-shells being held together by a crimp band.

5. The preconnectorized outdoor cable of claim 1, one of the two half-shells having at least one rib for securing the at least one strength component.

6. The preconnectorized outdoor cable of claim 1, the at least one plug connector further comprising a shroud and the crimp housing is at least partially disposed within the shroud, the shroud having two fingers for mating with a complementary receptacle, wherein the two fingers are disposed about 180 degrees apart and have different cross-sectional shapes for keying the plug connector with the complementary receptacle.

7. The preconnectorized outdoor cable of claim 1, the at least one plug connector further comprising a shroud having a first end and a second end, and a coupling nut.

8. The preconnectorized outdoor cable of claim 7, the shroud defining a pair of openings on opposite sides of the first end, the opening extending lengthwise from a medial portion of the shroud to the first end of the shroud, wherein the ferrule is accessible within the first end of the shroud.

9. The preconnectorized outdoor cable of claim 7, further comprising a heat shrink tube for weatherproofing the preconnectorized outdoor cable, the heat shrink tube being disposed about the second end of the shroud and a portion of the cable jacket.

10. The preconnectorized outdoor cable of claim 7, further comprising an O-ring disposed on the shroud for weatherproofing the at least one plug connector.

11. The preconnectorized outdoor cable of claim 1, the at least one plug connector further comprising a shroud having a first end and a second end, wherein the shroud has at least one alignment indicia for indicating a mating orientation.

12. The preconnectorized outdoor cable of claim 1, the at least one plug connector further comprising a shroud having a first end and a second end, the shroud has a plurality of fingers for mating with a complementary receptacle, wherein at least two of the fingers have different cross-sectional shapes for keying the plug connector with the complementary receptacle.

13. The preconnectorized outdoor cable of claim 1, the two half-shells being held together by a crimp band, wherein the crimp band secures the at least one tensile strength member.

14. The preconnectorized outdoor cable of claim 1, the at least one plug connector having a protective cap and a retention wire, wherein the protective cap is attached to the at least one plug connector by a retention wire.

15. The preconnectorized outdoor cable of claim 1, a plurality of the components of the at least one plug connector being formed from a UV stabilized material.

16. The preconnectorized outdoor cable of claim 1, the cable having two or more plug connectors.

17. The preconnectorized outdoor cable of claim 1, the optical transmission component further comprising a dry insert.

18. A preconnectorized outdoor cable, comprising:
an optical transmission component;
at least two strength components, the at least two strength components disposed on opposite sides of the optical transmission component;
a plurality of tensile strength members, the plurality of tensile strength members being generally arranged about the optical transmission component and generally contacting the optical transmission component, the plurality of tensile strength members being fibrous tensile strength members that essentially lack antibuckling strength;
a cable jacket, the cable jacket contacting at least a portion of the optical transmission component; and
at least one plug connector, the at least one plug connector being attached to an end of the cable, thereby connectorizing an optical waveguide, the optical waveguide being a portion of the optical transmission component, wherein the at least one plug connector includes a crimp housing and a connector assembly, the crimp housing having two half-shells that secure a portion of the connector assembly therebetween where the connector assembly includes a ferrule and connector housing.

19. The preconnectorized outdoor cable of claim 18, the two half-shells being held together by a crimp band.

20. The preconnectorized outdoor cable of claim 18, the at least one plug connector further comprising a shroud and the crimp housing is at least partially disposed within the shroud, the shroud having two fingers for mating with a complementary receptacle, wherein the two fingers are disposed about 180 degrees apart and have different cross-sectional shapes for keying the plug connector with the complementary receptacle.

21. The preconnectorized outdoor cable of claim 18, the at least one plug connector further comprising a shroud having a first end and a second end, and a coupling nut.

22. The preconnectorized outdoor cable of claim 21, the shroud defining a pair of openings on opposite sides of the first end, the opening extending lengthwise from a medial portion of the shroud to the first end of the shroud, wherein the ferrule is accessible within the first end of the shroud.

23. The preconnectorized outdoor cable of claim 21, further comprising a heat shrink tube for weatherproofing the preconnectorized outdoor cable, the heat shrink tube being disposed about the second end of the shroud and a portion of the cable jacket.

24. The preconnectorized outdoor cable of claim 21, further comprising an O-ring disposed on the shroud for weatherproofing the at least one plug connector.

25. The preconnectorized outdoor cable of claim 18, the at least one plug connector further comprising a shroud having a first end and a second end, wherein the shroud has at least one alignment indicia for indicating a mating orientation.

26. The preconnectorized outdoor cable of claim 18, the at least one plug connector further comprising a shroud having a first end and a second end, the shroud has a plurality of fingers for mating with a complementary receptacle, wherein at least two of the fingers have different cross-sectional shapes for keying the plug connector with the complementary receptacle.

27. The preconnectorized outdoor cable of claim 18, further comprising a heat shrink tube for weatherproofing the preconnectorized outdoor cable, the heat shrink tube being disposed over a portion of the at least one plug connector and a portion of the cable jacket.

28. The preconnectorized outdoor cable of claim 18, the at least one plug connector having a protective cap and a retention wire, wherein the protective cap is attached to the at least one plug connector by a retention wire.

29. The preconnectorized outdoor cable of claim 18, a plurality of the components of the at least one plug connector being formed from a UV stabilized material.

30. The preconnectorized outdoor cable of claim 18, the cable having two or more plug connectors.

31. The preconnectorized outdoor cable of claim 18, the optical transmission component further comprising a dry insert.

32. A preconnectorized outdoor cable, comprising:
an optical transmission component;
at least two strength components, the at least two strength components are disposed on opposite sides of the optical transmission component
a cable jacket; and
at least one plug connector, the at least one plug connector being attached to an end of the cable, thereby connectorizing an optical waveguide, the optical waveguide being a portion of the optical transmission component, wherein the at least one plug connector includes a crimp housing and a connector assembly, the crimp housing having two half-shells that secure a portion of the connector assembly therebetween where the connector assembly includes a ferrule and connector housing.

33. The preconnectorized outdoor cable of claim 32, the at least one plug connector further comprising a shroud and the crimp housing is at least partially disposed within the shroud, the shroud having two fingers for mating with a complementary receptacle, wherein the two fingers are disposed about 180 degrees apart and have different cross-sectional shapes for keying the plug connector with the complementary receptacle.

34. The preconnectorized outdoor cable of claim 32, the at least one plug connector further comprising at least one cable clamping portion and a crimp band, the at least one cable clamping portion securing one of the at least two strength components of the cable therein and the two half-shells being held together by the crimp band.

35. The preconnectorized outdoor cable of claim 32, the at least one plug connector further comprising a shroud having a first end and a second end, and a coupling nut.

36. The preconnectorized outdoor cable of claim 35, the shroud defining a pair of openings on opposite sides of the first end, the opening extending lengthwise from a medial portion of the shroud to the first end of the shroud, wherein the ferrule is accessible within the first end of the shroud.

37. The preconnectorized outdoor cable of claim 35, further comprising a heat shrink tube for weatherproofing the preconnectorized outdoor cable, the heat shrink tube being disposed about the second end of the shroud and a portion of the cable jacket.

38. The preconnectorized outdoor cable of claim 35, further comprising an O-ring disposed on the shroud for weatherproofing the at least one plug connector.

39. The preconnectorized outdoor cable of claim 32, the at least one plug connector further comprising a shroud having a first end and a second end, wherein the shroud has at least one alignment indicia for indicating a mating orientation.

40. The preconnectorized outdoor cable of claim 32, the at least one plug connector further comprising a shroud having a first end and a second end, the shroud has a plurality of fingers for mating with a complementary receptacle, wherein at least two of the fingers have different cross-sectional shapes for keying the plug connector with the complementary receptacle.

41. The preconnectorized outdoor cable of claim 32, the crimp housing being a portion of a crimp assembly that includes a crimp band for holding the crimp housing together.

42. The preconnectorized outdoor cable of claim 32, the at least one plug connector having a protective cap and a retention wire, wherein the protective cap is attached to the at least one plug connector by a retention wire.

43. The preconnectorized outdoor cable of claim 32, a plurality of the components of the at least one plug connector being formed from a UV stabilized material.

44. The preconnectorized outdoor cable of claim 32, the cable having two or more plug connectors.

45. The preconnectorized outdoor cable of claim 32, the optical transmission component further comprising a dry insert.

46. The preconnectorized outdoor cable of claim 18, the two half-shells being held together by a crimp band, wherein the crimp band secures one of the plurality of tensile strength members.

47. The preconnectorized outdoor cable of claim 18, further comprising at least tensile strength member and a crimp band, wherein the two half-shells are secured by the crimp band and the crimp band also secures the at least one tensile strength member.

48. The preconnectorized outdoor cable of claim 18, the at least one plug connector further comprising at least one cable clamping portion and a crimp band, the at least one cable clamping portion securing one of the at least two strength components of the cable therein and the two half-shells being held together by the crimp band.

* * * * *